US010549396B2

(12) United States Patent
Matsunaga et al.

(10) Patent No.: US 10,549,396 B2
(45) Date of Patent: Feb. 4, 2020

(54) ELECTRIC POWER TOOL

(71) Applicant: HITACHI KOKI CO., LTD., Tokyo (JP)

(72) Inventors: Kenichi Matsunaga, Hitachinaka (JP); Yoshikazu Kawano, Hitachinaka (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 933 days.

(21) Appl. No.: 14/292,813

(22) Filed: May 30, 2014

(65) Prior Publication Data
US 2014/0352995 A1 Dec. 4, 2014

(30) Foreign Application Priority Data

May 31, 2013 (JP) .................................. 2013-116223
Jul. 29, 2013 (JP) .................................. 2013-157001

(51) Int. Cl.
B23Q 15/007 (2006.01)
B25F 5/00 (2006.01)
B23Q 5/027 (2006.01)

(52) U.S. Cl.
CPC ......... B23Q 15/0075 (2013.01); B23Q 5/027 (2013.01); B25F 5/00 (2013.01)

(58) Field of Classification Search
CPC ...... B23Q 15/0075; B23Q 5/027; B23Q 5/00; B23Q 17/0961; B25F 5/00–5/029;
(Continued)

(56) References Cited

U.S. PATENT DOCUMENTS 4,628,233 A * 12/1986 Bradus .................. H02P 25/145
                                                    318/434
5,558,476 A *  9/1996 Uchida ................ B25H 1/0064
                                                    408/1 R
(Continued)

FOREIGN PATENT DOCUMENTS

JP          06-31512 A        2/1994
JP        11-164579 A         6/1999
(Continued)

OTHER PUBLICATIONS

Notification of Reasons for Refusal issued in corresponding Japanese Patent Application No. 2013-157001 dated Nov. 1, 2016, with English language translation.
(Continued)

Primary Examiner — Gloria R Weeks
Assistant Examiner — Dariush Seif
(74) Attorney, Agent, or Firm — McDermott Will & Emery LLP

(57) ABSTRACT

An object of the present invention is to provide an electric power tool capable of automatically changing the rotating speed of an electric motor in accordance with operation conditions. The electric power tool 11 which carries out an operation of polishing, peel-off, cutting, or the like by swinging a tip tool 13 attached to a tool retaining 31 part within the range of predetermined angles by the drive power of the electric motor 12, wherein the electric power tool has a control device configured to indirectly detect the load of the tip tool from a current value, and to control the rotating speed of the electric motor 12 to a maximum rotating speed and a minimum rotating speed on the basis of the load of the tip tool 13.

13 Claims, 26 Drawing Sheets

(58) Field of Classification Search
CPC .. B25F 3/00; H02P 21/00; H02P 7/245; H02P 6/08; H02P 4/00
USPC ..... 173/176, 93.6, 95, 114, 2; 318/461, 599, 318/811; 388/937
See application file for complete search history.

(56) References Cited

U.S. PATENT DOCUMENTS

| | | | | |
|---|---|---|---|---|
| 6,493,924 | B2* | 12/2002 | Das | H02P 6/08 29/596 |
| 6,836,614 | B2* | 12/2004 | Gilmore | B23P 19/066 173/176 |
| 6,873,124 | B2* | 3/2005 | Kawano | H02P 7/29 318/244 |
| 7,770,658 | B2* | 8/2010 | Ito | B23P 19/066 173/1 |
| 9,289,892 | B2* | 3/2016 | Schreiber | B25F 3/00 |
| 9,314,855 | B2* | 4/2016 | Ookubo | B25D 16/006 |
| 9,427,860 | B2* | 8/2016 | Ikuta | B27B 19/006 |
| 9,545,699 | B2* | 1/2017 | Furusawa | B24B 23/04 |
| 9,555,554 | B2* | 1/2017 | Thorson | B23B 31/4073 |
| 2001/0050540 | A1* | 12/2001 | Takayama | H02P 7/2913 318/599 |
| 2004/0070362 | A1* | 4/2004 | Patel | H02P 21/00 318/701 |
| 2004/0119431 | A1* | 6/2004 | Kawano | H02P 7/29 318/268 |
| 2005/0247459 | A1* | 11/2005 | Voigt | B25B 21/00 173/1 |
| 2006/0234617 | A1* | 10/2006 | Francis | B23D 59/001 452/174 |
| 2009/0295313 | A1* | 12/2009 | Suzuki | B25F 5/00 318/139 |
| 2011/0260414 | A1* | 10/2011 | Ota | B24B 23/02 279/8 |
| 2011/0284255 | A1 | 11/2011 | Ookubo et al. | |
| 2012/0167721 | A1* | 7/2012 | Fluhrer | B25B 21/00 81/54 |
| 2012/0318545 | A1* | 12/2012 | Schreiber | B25F 5/00 173/1 |
| 2013/0015789 | A1* | 1/2013 | Miyazaki | B25F 5/00 318/139 |
| 2013/0025078 | A1* | 1/2013 | Heil | A61C 17/221 15/22.1 |
| 2013/0186661 | A1* | 7/2013 | Okubo | B25D 11/005 173/2 |
| 2013/0186666 | A1* | 7/2013 | Yoshino | B25B 23/1475 173/176 |
| 2013/0327552 | A1* | 12/2013 | Lovelass | B25F 5/00 173/1 |
| 2014/0042839 | A1* | 2/2014 | Horie | H02M 1/32 310/50 |
| 2014/0045653 | A1* | 2/2014 | Atsumi | B25F 5/001 477/115 |
| 2014/0117892 | A1* | 5/2014 | Coates | A01D 69/02 318/139 |
| 2014/0123785 | A1* | 5/2014 | Sumi | B27B 19/006 74/45 |
| 2014/0374130 | A1* | 12/2014 | Nakamura | B25B 21/026 173/176 |
| 2015/0135907 | A1* | 5/2015 | Hirabayashi | B23Q 5/048 81/54 |
| 2015/0336249 | A1* | 11/2015 | Iwata | B25B 21/02 173/1 |
| 2016/0193673 | A1* | 7/2016 | Yoshida | B23D 47/12 30/388 |
| 2016/0221085 | A1* | 8/2016 | Zhong | B23B 31/10 |
| 2016/0250738 | A1* | 9/2016 | Leh | B25B 21/02 173/176 |
| 2017/0080545 | A1* | 3/2017 | Furusawa | B24B 23/04 |

FOREIGN PATENT DOCUMENTS

| | | |
|---|---|---|
| JP | 2004194422 A | 7/2004 |
| JP | 2010-162672 A | 7/2010 |
| JP | 2010173053 A | 8/2010 |
| JP | 2011-230204 A | 11/2011 |
| JP | 2012-232381 A | 11/2012 |

OTHER PUBLICATIONS

Notification of Reasons for Refusal issued in Japanese Patent Application No. 2013-116223 dated Oct. 18, 2016, with English lanuage translation.

* cited by examiner

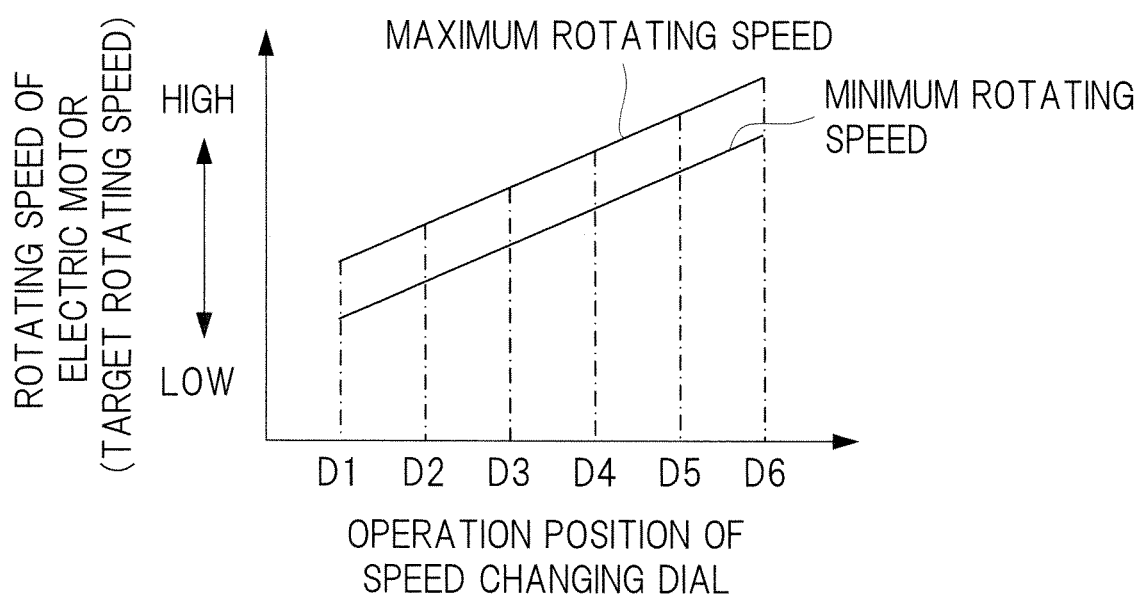

| | MAXIMUM VIBRATION NUMBER (TIMES/MINUTE) | MAXIMUM PERIPHERAL SPEED (m/MINUTE) |
|---|---|---|
| MINIMUM ROTATING SPEED | 15,000 | 16,000 |
| MAXIMUM ROTATING SPEED | 18,000~20,000 | 19,000~21,000 |

| ROTATING SPEED SET VALUE | LOAD JUDGE REFERENCE VALUE | NO-LOAD JUDGE REFERENCE VALUE |
|---|---|---|
| 1 | INITIAL CONDUCTION ANGLE +0.10ms | INITIAL CONDUCTION ANGLE +0.20ms |
| 2 | INITIAL CONDUCTION ANGLE +0.15ms | INITIAL CONDUCTION ANGLE +0.40ms |
| 3 | INITIAL CONDUCTION ANGLE +0.20ms | INITIAL CONDUCTION ANGLE +0.60ms |
| 4 | INITIAL CONDUCTION ANGLE +0.25ms | INITIAL CONDUCTION ANGLE +0.80ms |
| 5 | INITIAL CONDUCTION ANGLE +0.30ms | INITIAL CONDUCTION ANGLE +1.00ms |

FIG. 18

| ROTATING SPEED SET VALUE | CURRENT LOAD JUDGE REFERENCE VALUE | CURRENT NO-LOAD JUDGE REFERENCE VALUE |
|---|---|---|
| 1 | INITIAL CONDUCTION ANGLE +0.5A | INITIAL CONDUCTION ANGLE +1.0A |
| 2 | INITIAL CONDUCTION ANGLE +0.75A | INITIAL CONDUCTION ANGLE +1.5A |
| 3 | INITIAL CONDUCTION ANGLE +1.0A | INITIAL CONDUCTION ANGLE +2.0A |
| 4 | INITIAL CONDUCTION ANGLE +1.25A | INITIAL CONDUCTION ANGLE +2.5A |
| 5 | INITIAL CONDUCTION ANGLE +1.5A | INITIAL CONDUCTION ANGLE +3.0A |

| INITIAL CONDUCTION ANGLE | INCREMENTS OF CONDUCTION ANGLE | | | |
|---|---|---|---|---|
| | 0.01~0.2ms | 0.2~0.4ms | 0.4~0.6ms | 0.6ms OR HIGHER |
| 0~2.0ms | 4,000rpm | 6,000rpm | 8,000rpm | 10,000rpm |
| 2.0~4.0ms | 6,000rpm | 8,000rpm | 10,000rpm | 12,000rpm |
| 4.0~6.0ms | 8,000rpm | 10,000rpm | 12,000rpm | 14,000rpm |
| 6.0~8.0ms | 10,000rpm | 12,000rpm | 14,000rpm | 16,000rpm |
| 8.0~10.0ms | 12,000rpm | 14,000rpm | 16,000rpm | 18,000rpm |

| LOAD ROTATING SPEED | NO-LOAD JUDGE REFERENCE VALUE |
|---|---|
| 4,000rpm | INITIAL CONDUCTION ANGLE +0.30ms |
| 6,000rpm | INITIAL CONDUCTION ANGLE +0.40ms |
| 8,000rpm | INITIAL CONDUCTION ANGLE +0.50ms |
| 10,000rpm | INITIAL CONDUCTION ANGLE +0.60ms |
| 12,000rpm | INITIAL CONDUCTION ANGLE +0.70ms |
| 14,000rpm | INITIAL CONDUCTION ANGLE +0.80ms |
| 16,000rpm | INITIAL CONDUCTION ANGLE +0.90ms |
| 18,000rpm | INITIAL CONDUCTION ANGLE +1.00ms |

| INITIAL CURRENT VALUE | INCREMENTS OF CURRENT VALUE | | | |
|---|---|---|---|---|
| | 0.1~2.0A | 2.0~4.0A | 4.0~6.0A | 6.0A OR HIGHER |
| 0~1.0A | 4,000rpm | 6,000rpm | 8,000rpm | 10,000rpm |
| 1.0~2.0A | 6,000rpm | 8,000rpm | 10,000rpm | 12,000rpm |
| 2.0~3.0A | 8,000rpm | 10,000rpm | 12,000rpm | 14,000rpm |
| 3.0~4.0A | 10,000rpm | 12,000rpm | 14,000rpm | 16,000rpm |
| 4.0~5.0A | 12,000rpm | 14,000rpm | 16,000rpm | 18,000rpm |

| LOAD ROTATING SPEED | CURRENT NO-LOAD JUDGE REFERENCE VALUE |
|---|---|
| 4,000rpm | INITIAL CURRENT VALUE +0.5A |
| 6,000rpm | INITIAL CURRENT VALUE +1.0A |
| 8,000rpm | INITIAL CURRENT VALUE +1.5A |
| 10,000rpm | INITIAL CURRENT VALUE +2.0A |
| 12,000rpm | INITIAL CURRENT VALUE +2.5A |
| 14,000rpm | INITIAL CURRENT VALUE +3.0A |
| 16,000rpm | INITIAL CURRENT VALUE +3.5A |
| 18,000rpm | INITIAL CURRENT VALUE +4.0A |

ELECTRIC POWER TOOL

CROSS-REFERENCE TO RELATED APPLICATION

The present application claims priority from Japanese Patent Applications Nos. 2013-116223 filed on May 31, 2013 and 2013-157001 filed on Jul. 29, 2013, the content of which is hereby incorporated by reference into this application.

TECHNICAL FIELD OF THE INVENTION

The present invention relates to an electric power tool which carries out an operation by reciprocating a tip tool by an electric motor.

BACKGROUND OF THE INVENTION

An example of an electric power tool, which can carry out a variety of operations including an operation of cutting an object, an operation of polishing an object, and an operation of peeling off an object by transmitting the drive power of an electric motor to a tip tool, is described in Japanese Patent Application Laid-Open Publication No. 2012-232381 (hereinafter simply refer to as "Patent Document 1"). The electric power tool described in Patent Document 1 has: an electric motor provided in a tool main body; an output shaft attached to the tool main body; a drive power converting mechanism provided in the tool main body and configured to convert a rotative force of the electric motor into a swinging force of the output shaft; a tip tool attached to the output shaft; a control part provided in the tool main body and configured to control the rotating speed of the electric motor, a speed changing dial provided in the tool main body and operated by an operator, and a main switch.

In the electric power tool described in Patent Document 1, the operator operates the main switch, so that the electric motor is rotated or stopped. When the rotative force of the electric motor is transmitted to the output shaft via the drive power converting mechanism, the tip tool reciprocates within a range of a predetermined angle, and for example, an operation of cutting an object, an operation of polishing an object, or an operation of peeling off an object is carried out. In the electric power tool described in Patent document 1, the tip tool can be replaced in accordance with the operation to be carried out. Furthermore, when the operator operates the speed changing dial, the rotating speed of the electric motor can be increased or reduced in accordance with the load of the operation, the type of the tip tool, etc.

However, in the electric power tool described in Patent document 1, the operator has to operate the speed changing dial so as to change the rotating speed of the electric motor in accordance with the load of that tip tool, that is, the type of that tip tool and the type of that operation, and it is cumbersome to operate it.

As another example, an electric power tool is also described in Japanese Patent Application Laid-Open Publication No. 2010-162672 (hereinafter simply refer to as "Patent Document 2").

An object of the present invention is to provide an electric power tool capable of automatically changing the rotating speed of the electric motor in accordance with the load of the tip tool.

Another object of the present invention is to provide a technique capable of detecting the load state of the electric motor with high precision.

SUMMARY OF THE INVENTION

An electric power tool according one embodiment comprises: an electric motor configured to reciprocate a tip tool within a range of a predetermined angle; and a control part configured to detect a load of the tip tool, and to control a rotating speed of the electric motor on the basis of the detection result of the load.

An electric power tool according to another embodiment comprises: an electric motor configured to drive a tip tool selected from among various tip tools and attached to a tool attaching part, the tip tool being detachable from the tool attaching part; a switching element configured to control a voltage applied to the electric motor on the basis of a control signal; a rotating speed detecting part configured to detect a rotating speed of the electric motor; and a control part configured to generate the control signal so that the rotating speed of the electric motor becomes equal to a first rotating speed when a control value as the control signal is larger than a load judge reference value, and configured to generate the control signal so that the rotating speed of the electric motor becomes equal to a second rotating speed lower than the first rotating speed when the control value is smaller than a no-load judge reference value.

An electric power tool according to yet another embodiment comprises: a switching element configured to control an alternating-current voltage applied to an electric motor by a conduction angle on the basis of a control signal; a rotating speed detecting part configured to detect a rotating speed of the electric motor; and a control part configured to generate the control signal on the basis of the rotating speed of the electric motor detected by the rotating speed detecting part, and to output the control signal to the switching element, wherein when the conduction angle of the switching element is larger than a load judge reference value, the control part judges that the electric motor is in a load state, and generates the control signal so that the rotating speed of the electric motor becomes equal to a first rotating speed set by a setting signal; and when the conduction angle of the switching element becomes smaller than a no-load judge reference value, the control part judges that the electric motor is in a no-load state, and generates the control signal so that the rotating speed of the electric motor becomes equal to a second rotating speed lower than the first rotating speed set by the setting signal.

An electric power tool according to further embodiment comprises: an electric motor configured to drive a tip tool selected from among various tip tools and attached to a tool attaching part, the tip tool being detachable from the tool attaching part; a switching element configured to control a voltage applied to the electric motor on the basis of a control signal; a control part configured to generate and output the control signal to the switching element; and a current detecting part configured to detect a current flowing to the electric motor, and to output a current value indicative of the detected current to the control part; wherein when the current value indicative of the current flowing to the electric motor is larger than a current load judge reference value, the control part judges that the electric motor is in a load state, and generates the control signal so that the rotating speed of the electric motor becomes equal to a first rotating speed set by a setting signal; and when the current flowing to the electric motor becomes smaller than a current no-load judge reference value, the control part judges that the electric motor is in a no-load state, and generates the control signal so that the rotating speed of the electric motor becomes equal to a second rotating speed lower than the first rotating speed set by the setting signal.

An electric power tool according to still further embodiment comprising: a switching element configured to control a voltage applied to an electric motor by a conduction angle on the basis of a control signal; a rotating speed detecting part configured to detect a rotating speed of the electric motor; and a control part configured to generate the control signal on the basis of the rotating speed of the electric motor detected by the rotating speed detecting part, and to output the control signal to the switching element; wherein the control part detects an initial conduction angle of the switching element, judges that the electric motor is in a load state when the conduction angle of the switching element is increased from the initial conduction angle, and sets the rotating speed of the electric motor on the basis of the initial conduction angle and the increased conduction angle.

An electric power tool according to yet further embodiment, comprises: a switching element configured to control a voltage applied to an electric motor on the basis of a control signal; a rotating speed detecting part configured to detect a rotating speed of the electric motor; a current detecting part configured to detect a current flowing to the electric motor; and a control part configured to generate the control signal on the basis of the rotating speed of the electric motor detected by the rotating speed detecting part, and to output the control signal to the switching element; wherein the control part detects an initial current flowing to the electric motor, judges that the electric motor is in a load state when the current flowing to the electric motor is increased from the initial current value, and sets the rotating speed of the electric motor on the basis of the initial current value and the increased current value.

According to the present invention, the rotating speed of the electric motor is automatically controlled in accordance with the load of the tip tool. Therefore, it is possible to reduce operations of an operator by this electric power tool.

BRIEF DESCRIPTIONS OF THE DRAWINGS

FIG. 5 is an example of a map which is used for controlling the electric power tool of FIGS. 1A, 1B, and 2;

FIG. 15 is an explanatory drawing showing a configuration example of a first judge reference table stored in a control part of FIG. 14;

FIG. 18 is an explanatory drawing showing a configuration example of a first judge reference table of a second automatic switching process which is executed in the third embodiment of the present invention;

FIG. 21 is an explanatory drawing showing a configuration example of a first load rotating speed table which is used in a third automatic switching process in the fourth embodiment of the present invention;

FIG. 22 is an explanatory drawing showing a configuration example of a third judge reference table which used in the third automatic switching process;

FIG. 25 is an explanatory drawing showing a configuration example of a second load rotating speed table which is used in a fourth automatic switching process in the fifth embodiment of the present invention;

FIG. 26 is an explanatory drawing showing a configuration example of a fourth judge reference table which used in the fourth automatic switching process;

DESCRIPTION OF THE PREFERRED EMBODIMENTS

Figure 1A:
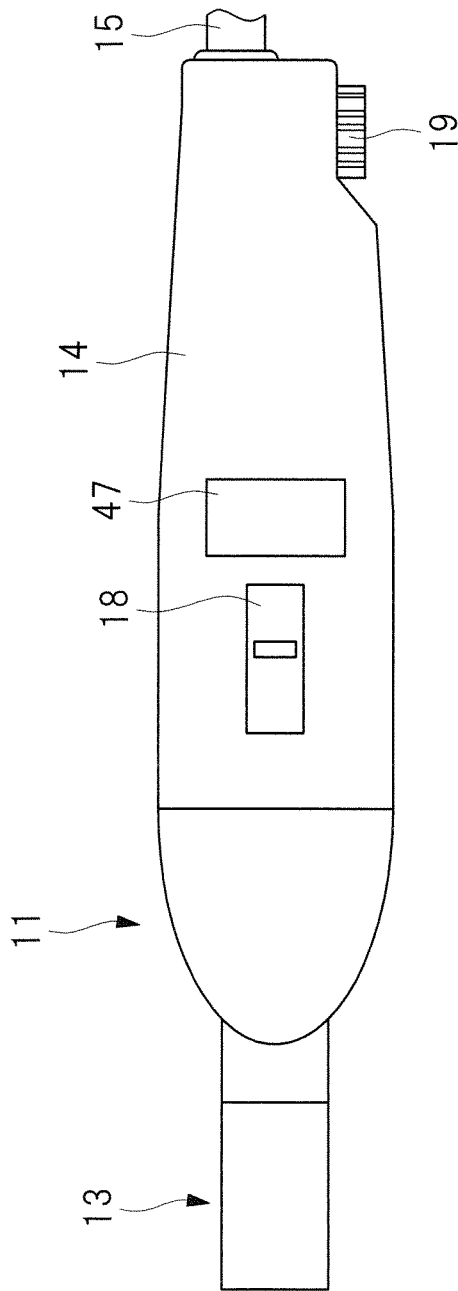
FIG. 1A is a plan view of an electric power tool of the first embodiment of the present invention.
Figure 1B:
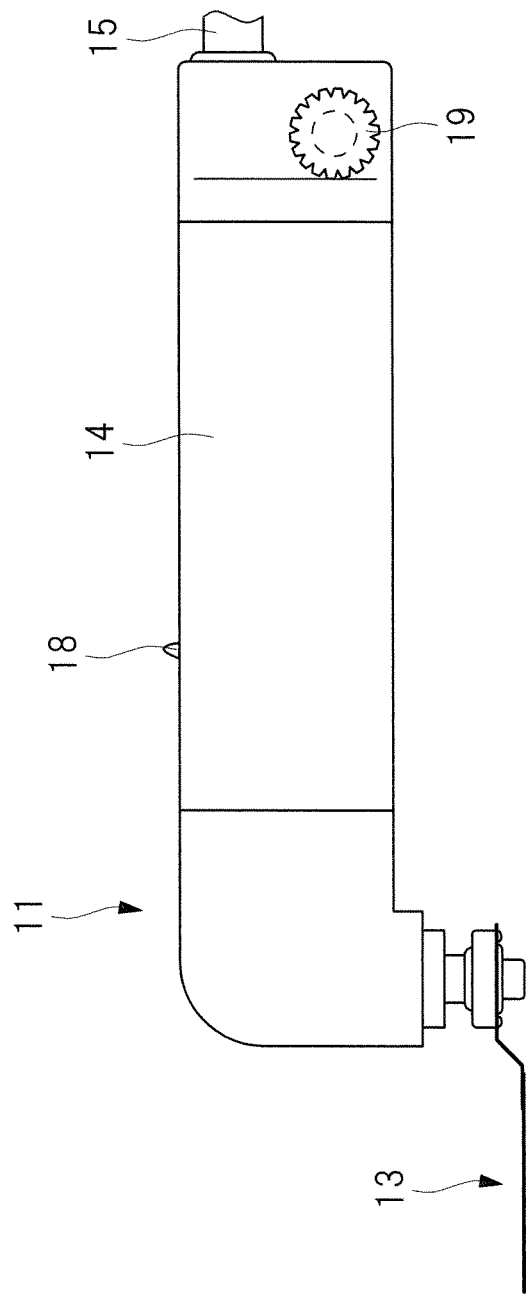
FIG. 1B is a side view of the electric power tool of the first embodiment of the present invention.
Figure 2:
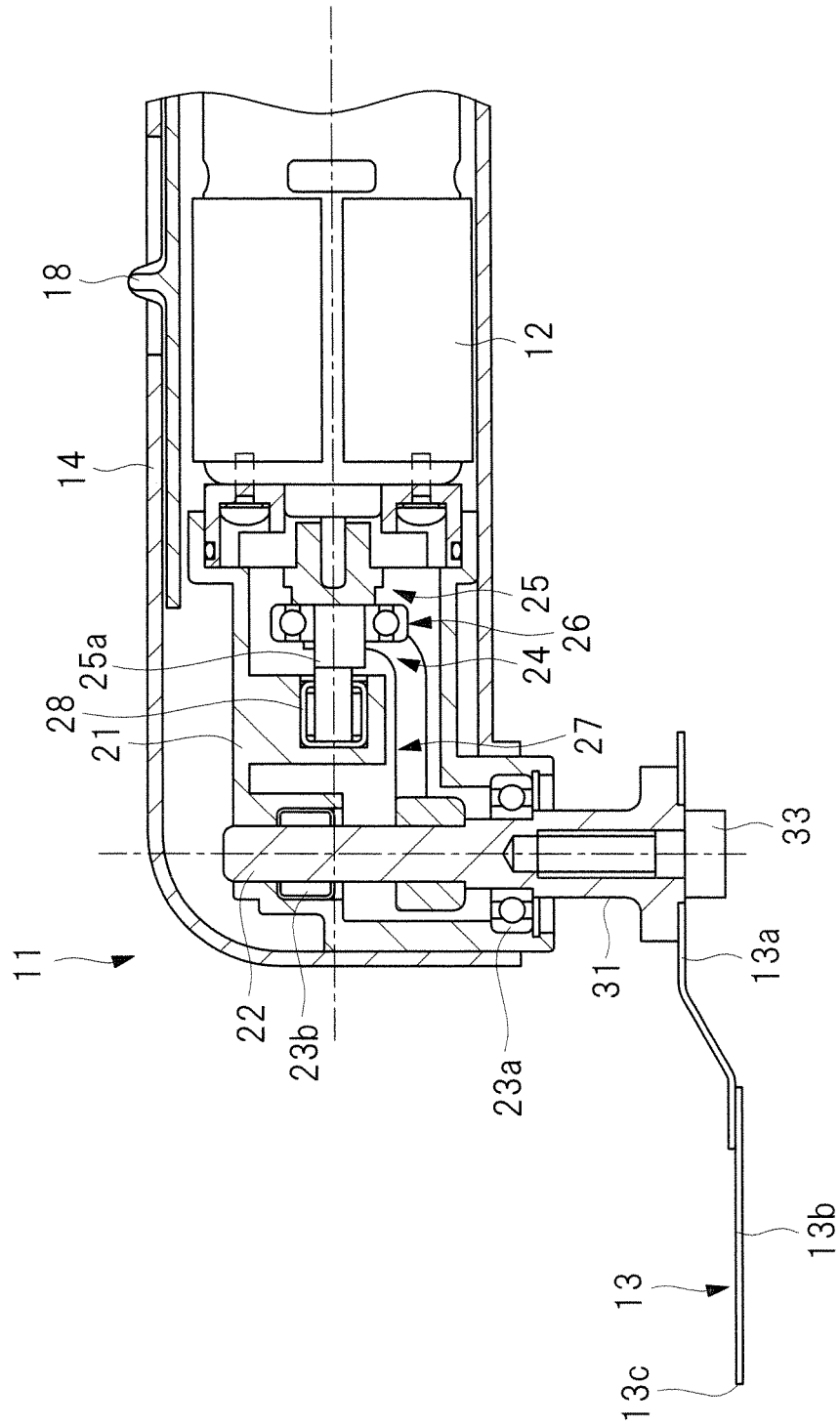
FIG. 2 is a sectional view of the electric power tool of FIG. 1.

Hereinafter, a first embodiment of the present invention will be explained in detail with reference to the drawings. An electric power tool 11 shown in FIGS. 1 and 2 is a power tool using an electric motor 12 as a drive power source. Various operations can be selectively carried out with the electric power tool 11 by changing a tip tool attached thereto. For example, if a tip tool provided with saw teeth is attached to the electric power tool 11, the electric power tool 11 can carry out an operation of cutting an object with the tip tool. If a tip tool to which a diamond chip, a carbide chip, or the like is fixed is attached to the electric power tool 11, the electric power tool 11 can carry out an operation of grinding or polishing an object with the tip tool. Furthermore, if a scraper-shaped tip tool is attached to the electric power tool 11, an operation of peeling off an object from a body can be carried out with the tip tool. The electric power tool 11 shown in FIGS. 1 and 2 is an example in which a scraper-shaped tip tool 13 is attached thereto.

The electric power tool 11 is provided with a tubular housing 14 as a tool main body, and the electric motor 12, which is the drive power source, is housed in the housing 14. A power supply cord 15 is connected to a longitudinal direction end of the housing 14, and electric power of an alternating-current power source is supplied to the electric motor 12 via the power supply cord 15.

A configuration of a control device serving as a control part, which controls the electric power tool 11, will be explained on the basis of FIGS. 2 to 4B. A control device 16, which controls the electric power tool 11, is provided in the housing 14. A main switch 17 is provided at an electric circuit, which connects an alternating-current power source 20 and the electric motor 12, and an operating piece 18 is connected to the main switch 17. If an operator operates the operating piece 18 and turns on the main switch 17, the electric power of the alternating-current power source 20 is supplied to the electric motor 12 via the control device 16, and a motor shaft 12a of the electric motor 12 is rotated. On the other hand, if the operating piece 18 is operated to turn off the main switch 17, the electric power of the alternating-current power source 20 is not supplied to the electric motor 12, and the motor shaft 12a of the electric motor 12 is stopped.

The housing 14 is provided with a speed changing dial 19. The speed changing dial 19 is a mechanism configured to set a target rotating speed of the electric motor 12, and the speed changing dial 19 is operated by an operator.

A holder 21 made of resin and fixed to the electric motor 12 is housed in the housing 14. An output shaft 22 is rotatably supported by the holder 21 via bearings 23a and 23b. The center line of the motor shaft 12a is orthogonal to the center line of the output shaft 22. A tool retaining part 31 is provided at a tip of the output shaft 22, and the tool retaining part 31 is disposed outside the housing 14.

Figure 4A:
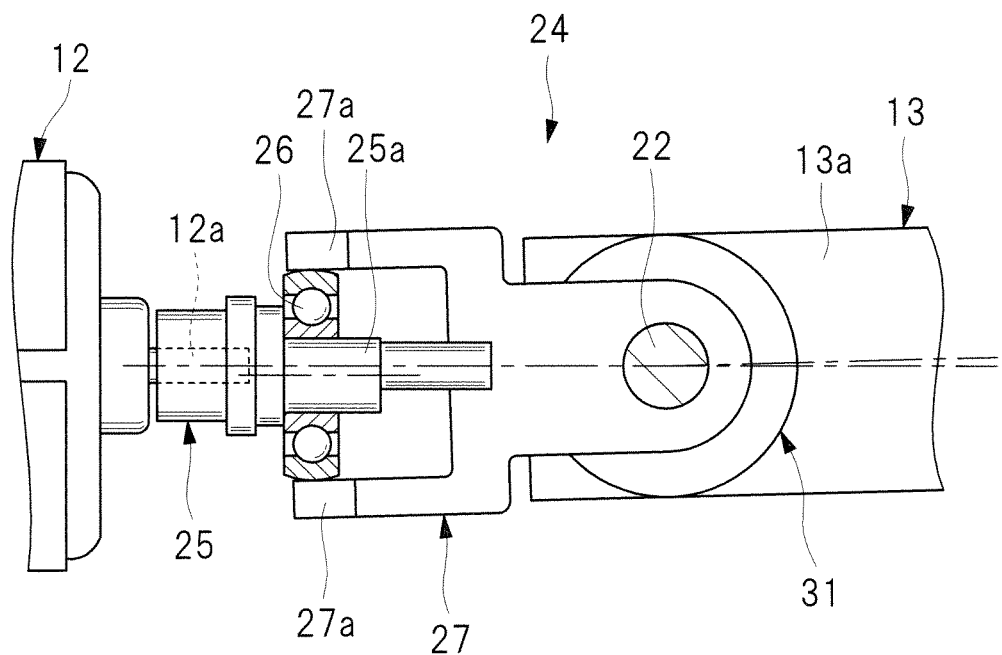
FIGS. 4A and 4B are partial views showing an operation of the electric power tool of FIG. 2.
Figure 4B:
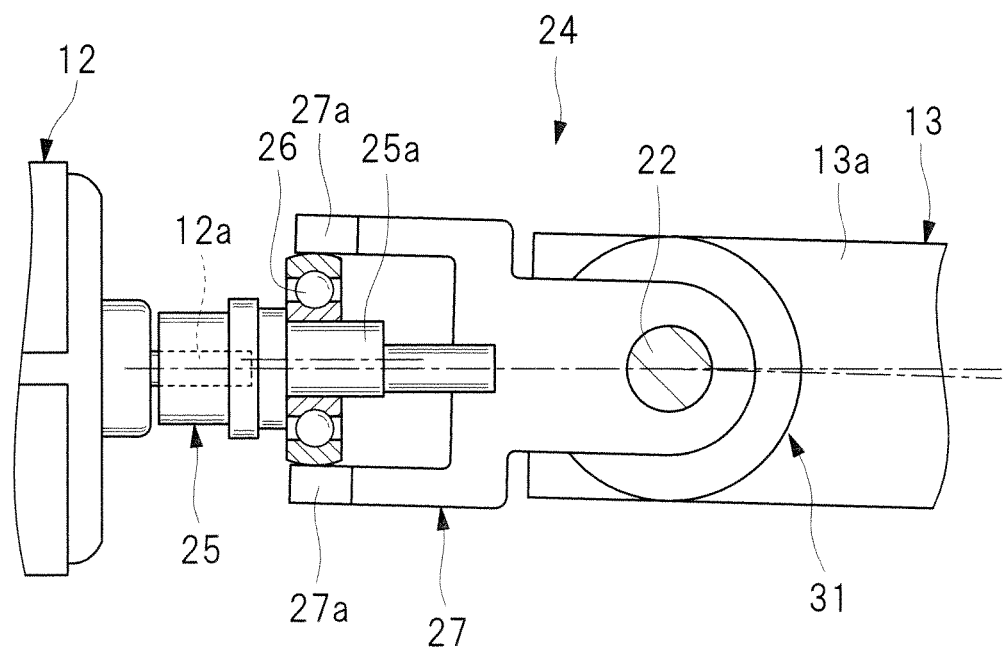

A vibration mechanism part 24 is provided in the holder 21. The vibration mechanism part 24 is a mechanism configured to convert the rotative force of the motor shaft 12a into a force causing the output shaft 22 to reciprocate within a range of a predetermined angle. As shown in FIGS. 2, 4A and 4B, the vibration mechanism part 24 is provided with a spindle 25 fixed to the motor shaft 12a. This spindle 25 is axially aligned with the motor shaft 12a, and a tip part of the spindle 25 is rotatably supported by a bearing 28 attached to the holder 21. The center line of the spindle 25 is coaxial with the center line of the motor shaft 12a, and the spindle 25 is provided with an eccentric shaft 25a. The center line of the eccentric shaft 25a is disposed at a position eccentric from the center line of the spindle 25.

An inner race of a ball bearing 26 is attached to the outer peripheral surface of the eccentric shaft 25a. The eccentric shaft 25a and the output shaft 22 are coupled to each other with a swing arm 27. The swing arm 27 is fixed to the output shaft 22. The swing arm 27 is formed into a U-shape and provided with a pair of arm parts 27a extending in parallel to the output shaft 22. These arm parts 27a are arranged at intervals equal to the outer diameter of an outer race of the ball bearing 26. The arm parts 27a are in contact with the outer race of the ball bearing 26. In other words, in this state, the outer race of the ball bearing 26 is sandwiched between the pair of arm parts 27a.

The tip tool 13 is attached to the tool retaining part 31 and detachable from the tool retaining part 31. The tip tool 13 is provided with a base part 13a formed by bending a rectangular plate material in the thickness direction thereof. The base part 13a is formed of, for example, metal material such as steel plate. A scraper main body 13b made of steel plate is fixed to a longitudinal direction end of the base part 13a by welding. Saw-shaped teeth 13c are provided at a tip of the scraper main body 13b, and a peel-off operation, etc. are carried out by using the teeth 13c.

The tip tool 13 is fastened and fixed to the tool retaining part 31 with a bolt 33. More specifically, this is a structure that, when the tip tool 13 is attached to the tool retaining part 31, the tip tool 13 is radially projecting from the shaft center of the output shaft 22 in a specific direction.

In the electric power tool 11, when electric power is supplied to the electric motor 12 and rotates the motor shaft 12a, the spindle 25 and the motor shaft 12a are integrally rotated. When the spindle 25 is rotated, the eccentric shaft 25a and the ball bearing 26 revolve about the center line of the spindle 25. As shown in FIGS. 4A and 4B, when the ball bearing 26 revolves about the center line of the spindle 25, the swing arm 27 reciprocates about the output shaft 22 within a range of a predetermined angle. More specifically, the swing arm 27 and the output shaft 22 integrally swing, in other words, reciprocates within a range of a predetermined angle. In this manner, the rotative force of the electric motor 12 is converted into a reciprocating motion force for the output shaft 22.

When the output shaft 22 reciprocates within a range of a predetermined angle, the tip tool 13 also reciprocates, in other words, vibrates about the output shaft 22 within a range of a predetermined angle. When the teeth 13c of the tip tool 13 are pushed against the boundary part between an object and a body, the teeth 13c dig into the part between the object and the body, so that a peel-off operation of detaching the object from the body can be carried out. When the peeling-off operation of detaching the object from the body is being carried out, a resistance force which disturbs the vibration of the tip tool 13 is applied to the electric motor 12 as a load.

In a plane including the center line of the spindle 25, the outer peripheral surface of the inner race of the ball bearing 26 is curved. Therefore, even when the swing arm 27 is swung about the output shaft 22 and tilted with respect to the eccentric shaft 25a, a state in which the arm parts 27a are in contact with the outer race of the ball bearing 26 is maintained.

A specific configuration of the above-described control device 16 will be explained on the basis of FIG. 3. The control device 16 is a device configured to control the rotating speed of the electric motor 12, and has the alternating-current power source 20, the main switch 17, coils 29 and 30, a rotating speed detector 49, a current-detecting resistance 32, etc. The control device 16 has the rotating speed detector 49, which detects the rotating speed, in other words, the actual rotating speed of the electric motor 12. Furthermore, the control device 16 has a rotating speed control circuit 34, a rotating speed setting circuit 35, etc.

The above-described rotating speed setting circuit 35 is an element configured to set a target rotating speed of the electric motor 12 on the basis of an operation of the operator.

The rotating speed setting circuit 35 has a variable resistor VR1, a variable resistor VR2, a control switch 38, a target-rotating speed adjusting part 39, and a tip-tool distinguishing part 50. The target-rotating speed adjusting part 39 includes a lever, a knob, a switch, etc., which are operated by the operator. The target-rotating speed adjusting part 39 is provided in the housing 14.

The variable resistor VR1 determines a maximum rotating speed as the target rotating speed of the electric motor 12 on the basis of an operation of the speed changing dial 19. The variable resistor VR2 determines a minimum rotating speed as the target rotating speed of the electric motor 12 on the basis of an operation of the speed changing dial 19.

The tip-tool distinguishing part 50 is an element configured to distinguish the tip tool 13, more specifically, to distinguish whether the tip tool 13 is a tool for peeling, cutting, or polishing. The tip-tool distinguishing part 50 can be provided, for example, at the tool retaining part 31. A label on which a barcode indicating the type of the tip tool 13 is recorded can be pasted on the base part 13a of the tip tool 13, and the tip-tool distinguishing part 50 can be composed of a non-contact optical sensor. When composed in this manner, the type of the tip tool 13 can be distinguished by reading the barcode of the label by the tip-tool distinguishing part 50.

Also, bumpy patterns depending on the type of this tip tool 13 may be formed on the base part 13a of the tip tool 13, and the tip-tool distinguishing part 50 may be composed of a contact-type sensor. In this example, when the bumpy patterns are brought into contact with the tip-tool distinguishing part 50, the type of the tip tool 13 can be distinguished. Then, on the basis of the type of the tip tool 13 distinguished by the tip-tool distinguishing part 50, the rotating speed setting circuit 35 sets a target rotating speed of the electric motor 12. On the basis of the type of the tip tool 13, it is possible to set a various target rotating speed.

On the basis of an operation of the speed changing dial 19, a control operation of determining the minimum rotating speed and the maximum rotating speed is carried out by using, for example, the map of FIG. 5. In the map of FIG. 5, the horizontal axis shows operation positions of the speed changing dial 19, and the vertical axis shows the rotating speed of the electric motor 12. In this example, operation positions D1 to D6 are shown as the operation positions of the speed changing dial 19, and the points between the operation positions can be also selected. The map of FIG. 5 shows a characteristic that the minimum rotating speed and the maximum rotating speed are increased as it gets closer from the operation position D1 to the operation position D6.

In addition, this does not mean that the target rotating speed of the electric motor 12 is determined between the minimum rotating speed and the maximum rotating speed. When the rotating speed of the electric motor 12 is controlled, basically, the minimum rotating speed or the maximum rotating speed is selected on the basis of the load of the electric motor 12.

The control switch 38 is operated by the operator to determine whether or not to carry out a switching between the minimum rotating speed and the maximum rotating speed on the basis of the load of the electric motor 12. When the operator turns on the control switch 38 and selects "switch control", the switching between the minimum rotating speed and the maximum rotating speed can be carried out on the basis of the load of the electric motor 12. On the other hand, when the operator turns off the control switch 38 and selects "no switch control", the maximum rotating speed is selected regardless of the load of the electric motor 12.

When the target-rotating speed adjusting part 39 is operated, the minimum rotating speed and the maximum rotating speed shown in the map of FIG. 5 can be arbitrarily changed by the operator. More specifically, the minimum rotating speed and the maximum rotating speed shown in FIG. 5 are selected on the basis of the operation position of the speed changing dial 19, and, when the target-rotating speed adjusting part 39 is operated, the minimum rotating speed and the maximum rotating speed shown in FIG. 5 can be separately set by the operator.

Next, a configuration of a rotating speed control circuit 34 will be explained hereinafter. The rotating speed control circuit 34 carries out a feedback control so that the actual rotating speed of the electric motor 12 comes close to the target rotating speed selected by the rotating speed setting circuit 35. The rotating speed control circuit 34 has a rotating speed detecting circuit 40, a phase control circuit 41, a current detecting circuit 42, and a comparison operation circuit 43. The rotating speed detecting circuit 40 is connected to the rotating speed detector 49, and configured to detect the actual rotating speed of the electric motor 12. The phase control circuit 41 is configured to control the actual rotating speed of the electric motor 12 by controlling the guide angle of the rotating speed detector 49. For example, when the voltage applied to the electric motor 12 is increased, the actual rotating speed of the electric motor 12 is increased, and when the voltage applied to the electric motor 12 is reduced, the actual rotating speed of the electric motor 12 is reduced. The current detecting circuit 42 is configured to detect the current value of the electric power supplied to the electric motor 12. On the basis of the current value of the electric power supplied to the electric motor 12, the load of the electric motor 12 is detected. The comparison operation circuit 43 is configured to compare the actual rotating speed and the target rotating speed with each other.

Furthermore, the housing 14 is provided with a display part 47. The display part 47 has, for example, a liquid crystal screen, the display part 47 is configured to display the target rotating speed, the actual rotating speed, etc., and the operator can visually confirm the display part 47.

Figure 6:
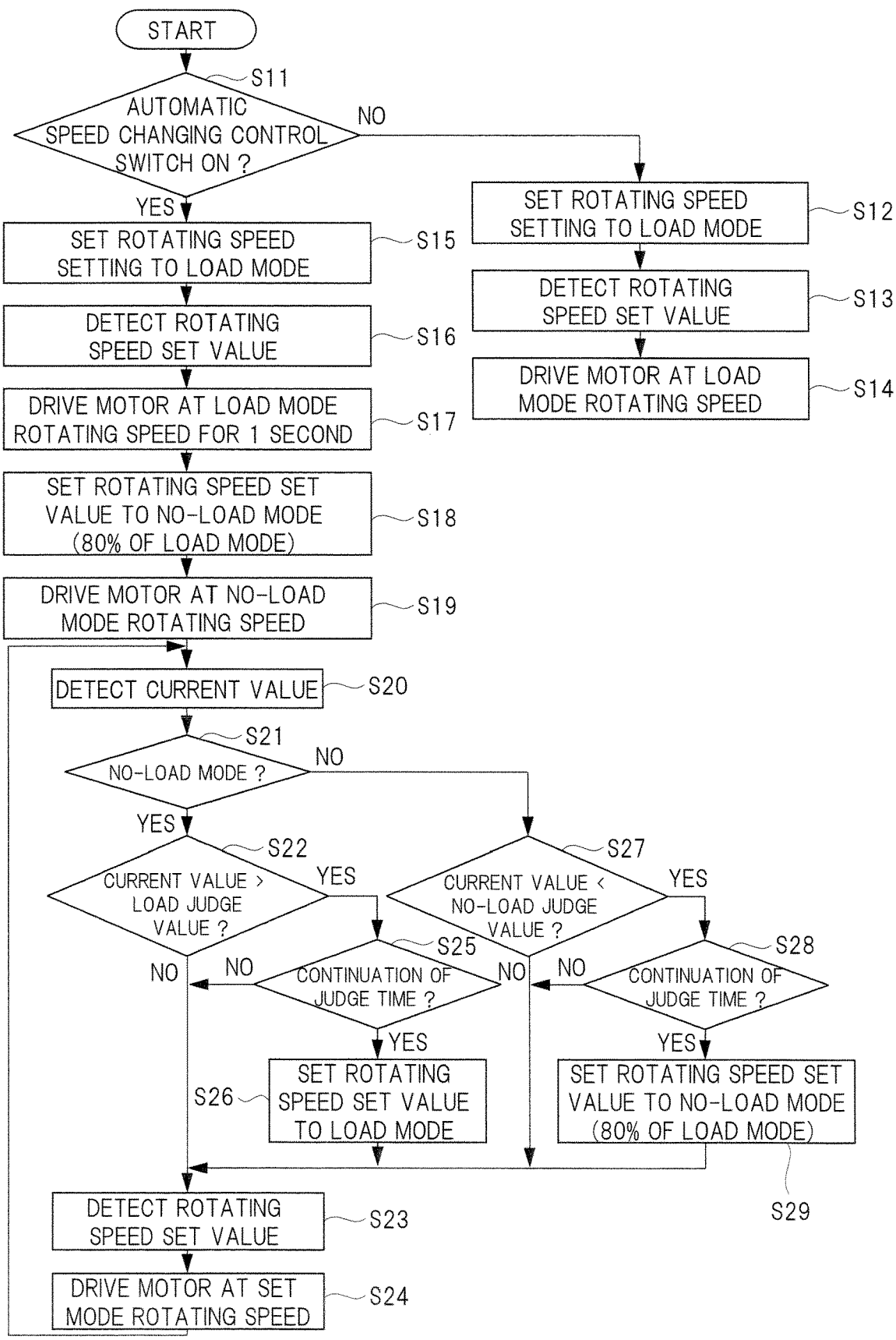
FIG. 6 is a flow chart showing a control example which is executed in the electric power tool of FIGS. 1A, 1B, and 2.

Next, a control example of the electric power tool 11 will be explained on the basis of the flow chart of FIG. 6. First, in step S11, in a state in which the main switch 17 is turned on, the determination is made on whether or not the control switch 38 is turned on. When the determination result of step S11 is "NO", the process proceeds to step S12, and a process of setting the rotating speed setting of the electric motor 12 to a load mode is executed. This load mode is a state in which the maximum rotating speed is selected as the target rotating speed of the electric motor 12.

In step S13 subsequent to step S12, a rotating speed set value is detected. More specifically, the maximum rotating speed corresponding to the operation position of the speed changing dial 19 is detected. In step S14 subsequent to step S13, the electric motor 12 is driven at the rotating speed corresponding to the load mode. More specifically, in step S14, a control of causing the actual rotating speed of the electric motor 12 to be the maximum rotating speed detected in step S13 is executed. When the control switch 38 is turned off in this manner, the rotating speed of the electric motor 12 is fixed to the maximum rotating speed, and the minimum rotating speed is not selected.

On the other hand, when the determination result of step S11 is "YES", a control of step S15 is executed. The control of step S15 is the same as that of step S12. Subsequent to step S15, a control of step S16 is executed. The control of step S16 is the same as that of step S13. In step S17 subsequent to step S16, the electric motor 12 is driven for 1 second after the electric motor 12 starts rotating at the rotating speed of the load mode. More specifically, in step S17, a control of maintaining the actual rotating speed of the electric motor 12 for 1 second at the maximum rotating speed detected in step S16 is executed.

This is for informing the operator of the set maximum rotating speed. Since there is an optimum rotating speed depending on the type, in other words, the operation substance of the tip tool 13 attached to the tool retaining part 31, the operator can find out whether or not the desired operation is appropriate for the set maximum rotating speed.

In step S18 subsequent to step S17, a control of setting the rotating speed setting of the electric motor 12 to a no-load mode is executed. This no-load mode is a state in which the minimum rotating speed shown in FIG. 5 is selected as the target rotating speed of the electric motor 12. The minimum rotating speed in the no-load mode is about 80% of the maximum rotating speed of the load mode. In step S19 subsequent to step S18, the electric motor 12 is driven at the rotating speed of the no-load mode. More specifically, in step S19, the actual rotating speed of the electric motor 12 comes close to the minimum rotating speed.

Furthermore, in step S20, the current value of the electric power supplied to the electric motor 12 is detected, and in step S21, the determination is made on whether or not the electric motor 12 is driven in the no-load mode. The detection on whether or not the electric motor 12 is driven in the no-load mode can be detected from the current value of the electric power supplied to the electric motor 12. When "YES" is determined in step S21, the determination is made in step S22 on whether or not the current value is increased and exceeds a load judge value.

Figure 7:
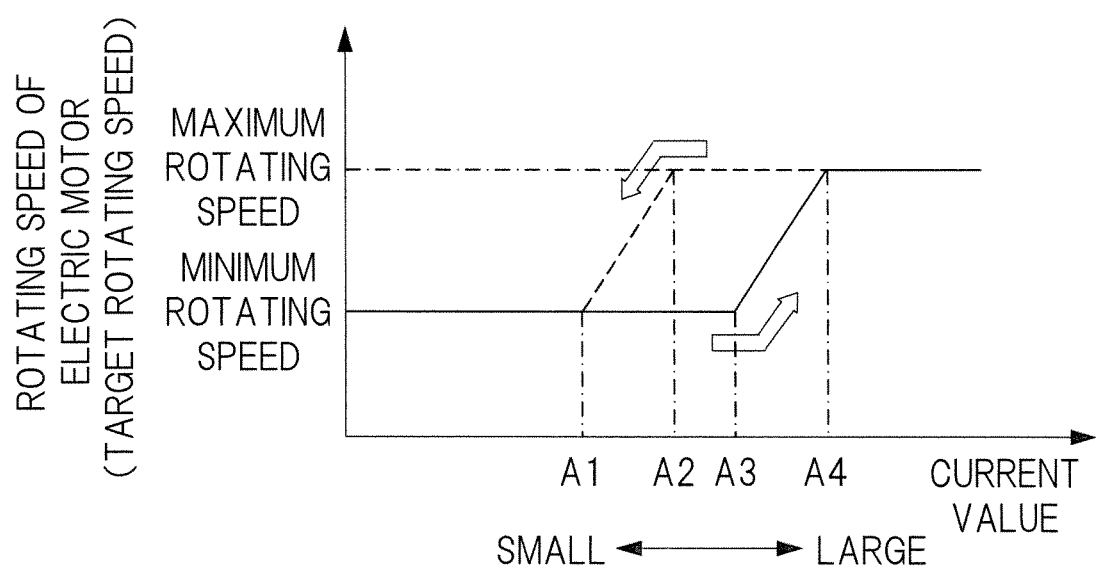
FIG. 7 is an example of a map which is used for controlling the electric power tool of FIGS. 1A, 1B, and 2.

For example, as shown in FIG. 7, when "NO" is determined in step S22 since the current value is equal to or less than a current value "A3" as the load judge value, the process proceeds to step S23, and a control of detecting the rotating speed set value is executed. The control of step S23 is the same as that of step S16. In step S24, the electric motor 12 is driven at the rotating speed of the set mode, and the process returns to step S20. When "NO" is determined in step S22 and the process proceeds to step S24, in step S24, a control of causing the actual rotating speed of the electric motor 12 to become equal to the minimum rotating speed corresponding to the operation position of the speed changing dial 19 is executed.

On the other hand, when "YES" is determined in step S22 since the current value is exceeding the current value "A3" shown in FIG. 7 at the point of determination in above-described step S22, the process proceeds to step S25, and the determination is made on whether or not the state in which the current value is exceeding the current value "A3" has been continued for a judge period of time or more. The judge period of time is stored in the rotating speed control circuit 34 in advance. When "NO" is determined in step S25, the process proceeds to step S23. When "YES" is determined in step S25, the rotating speed setting is set to the load mode in step S26, and a control of steps S23 and S24 is executed. More specifically, in step S26, the maximum rotating speed is selected as the target rotating speed of the electric motor 12.

Then, when the process proceeds to step S24 through step S26, in step S24, a control of causing the actual rotating speed of the electric motor 12 to become equal to the maximum rotating speed corresponding to the operation position of the speed changing dial 19 is executed. When the target rotating speed of the electric motor 12 is changed from the minimum rotating speed to the maximum rotating speed, the rotating speed is gently changed at a gradient determined in advance as shown by a solid line within a range from the current value "A3" to a current value "A4" of FIG. 7.

When "NO" is determined in above-described step S21, in step S27, the determination is made on whether or not the current value has been reduced and become less than a current value "A2" serving as a no-load judge value of FIG. 7. When "NO" is determined in step S27, a control of steps S23 and S24 is executed. When the process proceeds to step S24 since "NO" is determined in step S27, in step S24, a control of causing the actual rotating speed of the electric motor 12 to become equal to the maximum rotating speed corresponding to the operation position of the speed changing dial 19 is executed.

On the other hand, When "YES" is determined in step S27, the process proceeds to step S28, and the determination is made on whether or not the state in which the current value is less than the current value "A4" has been continued for the judge period of time or more. When "NO" is determined in step S28, a control of steps S23 and S24 is executed. When the process proceeds to step S24 since "NO" is determined in step S28, in step S24, a control of causing the actual rotating speed of the electric motor 12 to become equal to the maximum rotating speed corresponding to the operation position of the speed changing dial 19 is executed.

When "YES" is determined in step S28, in step S29, a control of setting the rotating speed setting mode to the no-load mode is executed, and a control of steps S23 and S24 is then executed. The control of step S29 is the same as that of step S18. When "NO" is determined in step S21 to proceed to step S29 as described above, wherein the target rotating speed of the electric motor 12 is changed from the maximum rotating speed to the minimum rotating speed, the rotating speed is gently changed at a gradient determined in advance as shown by a broken line within a range from the current value "A2" to the current value "A1" of FIG. 7. The map of FIG. 7 shows a relation: the current value "A1"<the current value "A2"<the current value "A3"<the current value "A4". The maximum rotating speed and the minimum rotating speed shown in FIG. 7 can be separately changed by operating the target-rotating speed adjusting part 39 by the operator. Furthermore, when the operator operates the target-rotating speed adjusting part 39, and changes the maximum rotating speed, the minimum rotating speed is changed in conjunction with that, which is an employable configuration. In this case, for example, the minimum rotating speed is set at the value which is 80% of the maximum rotating speed.

Figure 8:
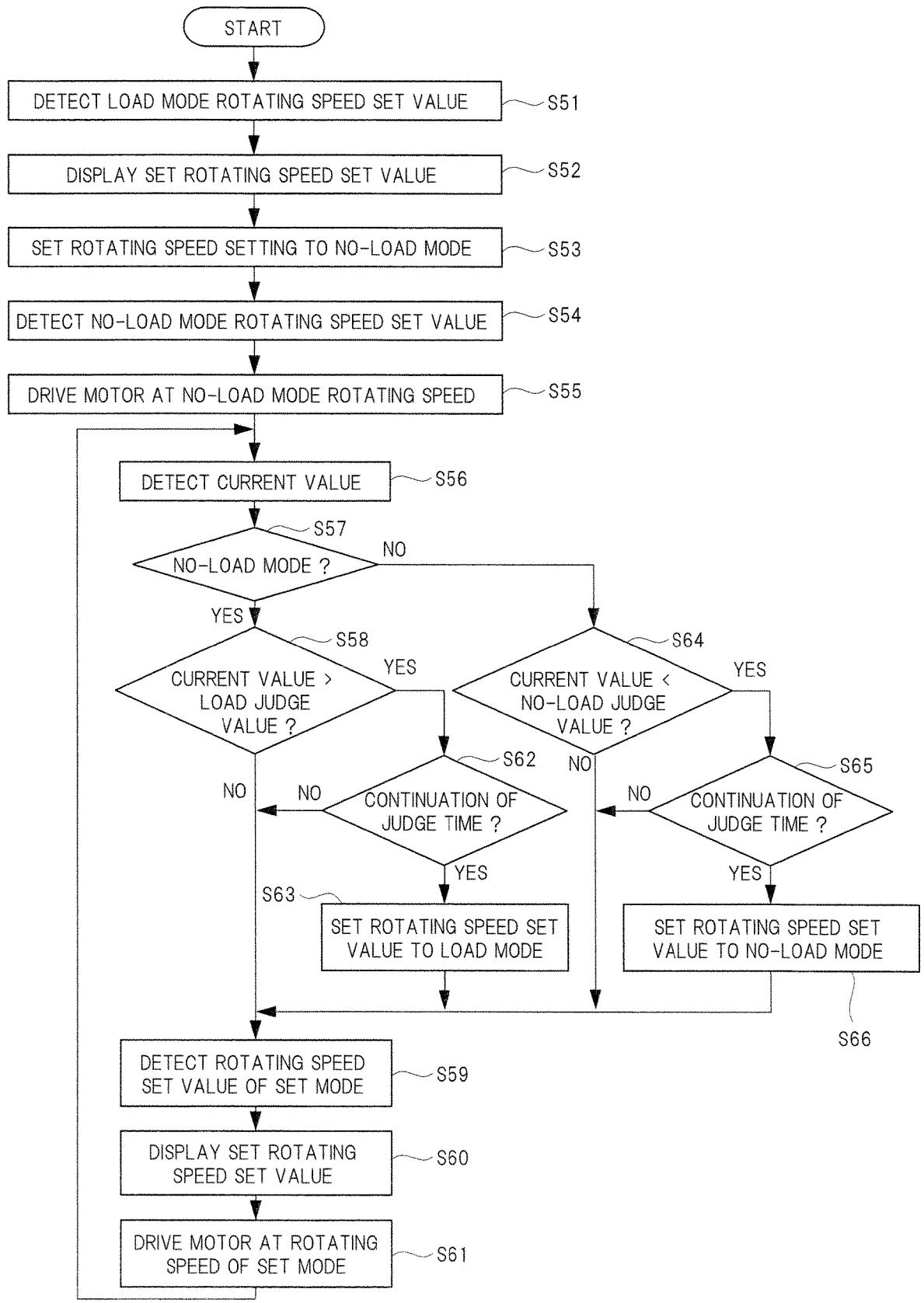
FIG. 8 is a flow chart showing a control example which is executed in the electric power tool of FIGS. 1A, 1B, and 2.

Then, another control example to be executed by the electric power tool 11 will be explained on the basis of the flow chart of FIG. 8. In step S51, when the control switch 38 is turned on to select "switch control" and the main switch 17 is turned on, the set value of the load mode rotating speed is detected as the target rotating speed of the electric motor 12. More specifically, in step S51, the maximum rotating speed corresponding to the operation position of the speed changing dial 19 is detected. In step S52, a control of displaying the set value of the rotating speed set in step S51 by the display part 47 is executed.

In step S53, when a predetermined period of time has elapsed after the load mode rotating speed is set, the set value of the target rotating speed of the electric motor 12 is changed from the load mode to the no-load mode. In step S54, the set value of the no-load mode rotating speed corresponding to the operation position of the speed changing dial 19, in other words, the minimum rotating speed is set as the target rotating speed. Then, in step S55, a control of driving the electric motor 12 at the no-load mode rotating speed set in step S54 is executed.

Furthermore, the current value is detected in step S56, and the determination is made on whether or not it is the no-load mode in step S57. The control of step S56 is the same as that of step S20, and the control of step S57 is the same as that of step S21. When "YES" is determined in step S57, the control of step S58 is carried out. The control of step S58 is the same as that of step S22. When "NO" is determined in step S58, the control of step S59 is executed. The control of step S59 is the same as that of step S23.

In step S60 subsequent to step S59, a control of displaying the set target rotating speed of the electric motor 12 by the display part 47 is carried out. Then, the control of step S61 is executed, and the process returns to step S56. The control of step S61 is the same as that of step S24.

When "YES" is determined in above-described step S58, the control of step S62 is executed. The control of step S62 is the same as that of step S25, and when "NO" is determined in step S62, the process proceeds to step S59. When "YES" is determined in step S62, the control of step S63 is executed, and the process proceeds to step S59. The control of step S63 is the same as that of step S26.

On the other hand, when "NO" is determined in above-described step S57, the control of step S64 is executed. The control of step S64 is the same as that of step S27, and, When "NO" is determined in step S64, the process proceeds to step S59. When "YES" is determined in step S64, the control of step S65 is executed. The control of step S65 is the same as that of step S28. When "NO" is determined in step S65, the process proceeds to step S59. When "YES" is determined in step S65, the process proceeds to step S66. The control of step S66 is the same as that of step S29. Thus, in the first embodiment, before starting an operation, the operator can be informed by displaying the set rotating speed by the display part 47.

Figure 9:
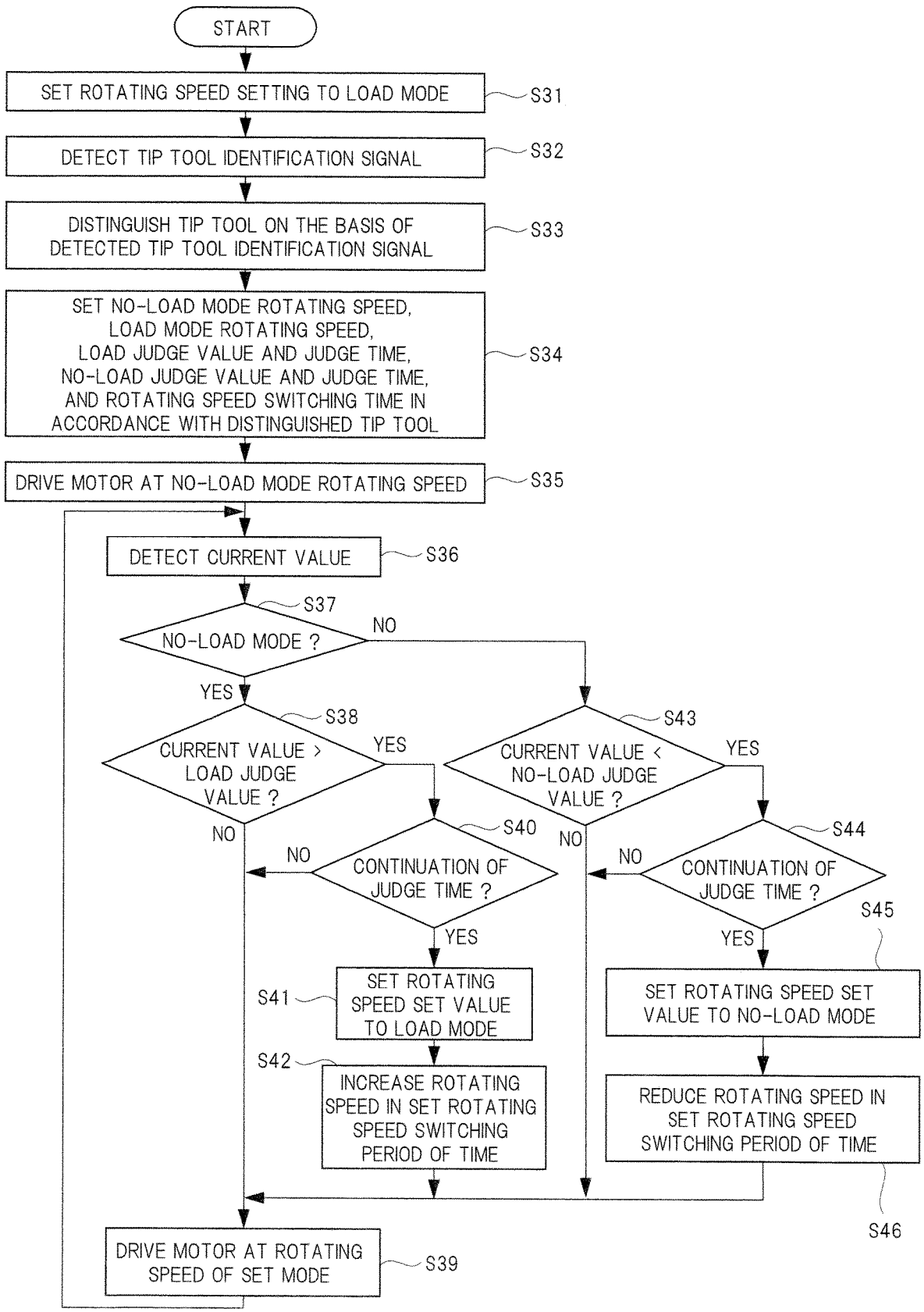
FIG. 9 is a flow chart showing a control example which is executed in the electric power tool of FIGS. 1A, 1B, and 2.

Then, another control example to be executed in the electric power tool 11 will be explained on the basis of the flow chart of FIG. 9. In step S31, when the control switch 38 is turned on to select "switch control" and the main switch 17 is on, the maximum rotating speed of the load mode is set as the target rotating speed of the electric motor 12. The rotating speed setting circuit 35 detects an identification signal of the tip tool 13, which is generated by the tip-tool distinguishing part 50, in step S32. The rotating speed setting circuit 35 distinguishes the type of the tip tool 13 on the basis of the identification signal in step S33. For example, it distinguishes whether the tip tool 13 is used for a polishing, a peel-off, or a cutting.

Then, in step S34, the rotating speed setting circuit 35 sets the minimum rotating speed of the no-load mode and the maximum rotating speed of the load mode in accordance with the distinguished type of the tip tool 13 as the target rotating speeds of the electric motor 12. In step S34, a load judge value and a judge period of time, a no-load judge value and a judge period of time, and rotating speed switching time are set for each type of the tip tool 13.

Figures 10, 11:
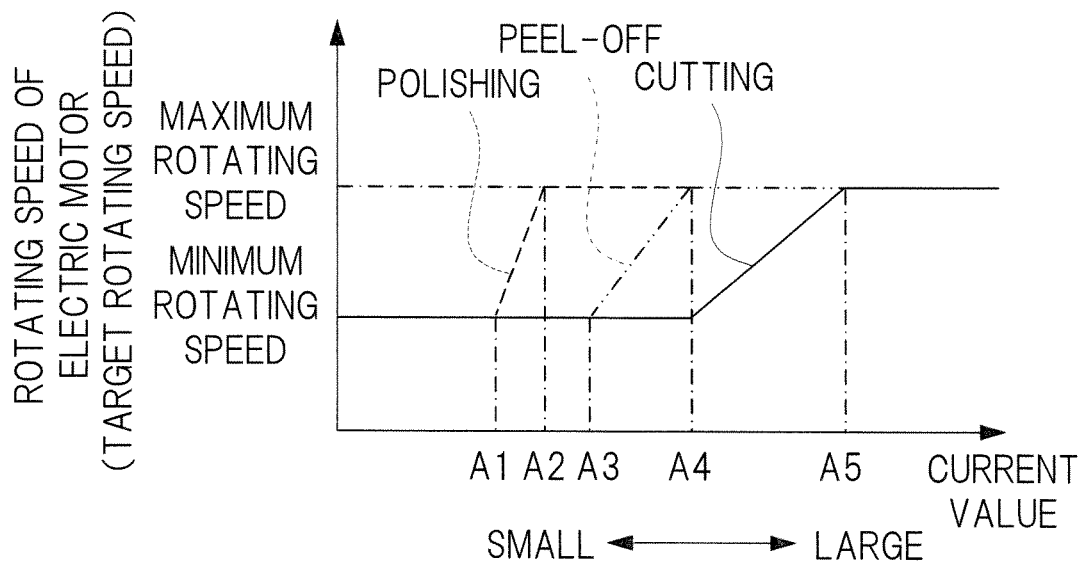
FIG. 10 is a chart showing characteristics of the electric power tool of FIGS. 1A, 1B, and 2.
FIG. 11 is an example of a map which is used for controlling the electric power tool of FIGS. 1A, 1B, and 2.

The control of step S34 will be explained with reference to the map of FIG. 10. In FIG. 10, as the rotating speeds of the electric motor 12, the rotating speed of a tip tool for polishing is shown by a broken line, the rotating speed of a tip tool for peel-off is shown by a two-dot chain line, and the rotating speed of the tip tool for cutting is shown by a solid line. A current value "A1" is a load judge value of the tip tool for polishing, and a current value "A2" is a no-load judge value for the tip tool for polishing.

The current value "A3" is a load judge value of the tip tool for peel-off, and the current value "A4" is a no-load judge value of the tip tool for peel-off and is a load judge value of the tip tool for cutting. A current value A5 is a no-load judge value of the tip tool for cutting. In the map of FIG. 10, on the basis of the type of the tip tool, the current value at which the target rotating speed of the electric motor set is changed.

The current values A1 to A5 has a relation: the current value "A1"<the current value "A2"<the current value "A3"<the current value "A4"<the current value A5. The operator can separately change the maximum rotating speed and the minimum rotating speed shown in FIG. 10 by operating the target-rotating speed adjusting part 39. In a case in which the tip tool for cutting is attached, when the judge value for increasing the rotating speed of the electric motor 12 is the same current value as that of the tip tool for polishing or for peel-off, only alignment of a blade tip with an object material and slight push-in thereof causes the current value to exceed the judge value. As a result, it is conceivable that the rotating speed of the electric motor 12 is increased during the alignment, and the cutting location is misaligned. Therefore, in the case of the tip tool for cutting, the load judge value larger than those of the tip tools for other operations is used.

Furthermore, the judge period of time is a determination criterion of the fact that a predetermined current value has been continued when switching between the load mode and the no-load mode is carried out. Furthermore, the rotating speed switching time is the time required from when the control of switching the rotating speed between the rotating speed of the load mode and the rotating speed of the no-load mode is started until the control is completed. Thus, as shown in FIG. 10, when the switching is carried out between the maximum rotating speed and the minimum rotating speed, the rotating speed is switched at a gradient determined in advance.

Subsequent to step S34, the control of step S35 is executed. The control of step S35 is the same as that of step S19. Subsequent to step S35, the control of step S36 is executed. The control of step S36 is the same as that of step S20. Subsequent to step S36, the control of step S37 is executed. The control of step S37 is the same as that of step S21, and the current value corresponding to the type of the tip tool 13 is used in step S37.

When "YES" is determined in step S37, the control of step S38 is executed. The control of step S38 is the same as that of step S22, and the load judge value corresponding to the type of the tip tool 13 is used in step S38. When "NO" is determined in step S38, the control of step S39 is executed, and the process returns to step S36. The control of step S39 is the same as that of step S24, and the rotating speed corresponding to the type and the mode of the tip tool 13 is used.

When "YES" is determined in above-described step S38, the control of step S40 is executed. The control of step S40 is the same as that of step S25, and the judge period of time set in step S34 for each type of the tip tool 13 is used. When "NO" is determined in step S40, the process proceeds to step S39. When "YES" is determined in step S40, the control of step S41 is executed. The control of step S41 is the same as that of step S26, and the maximum rotating speed, which is set for the load mode for each type of the tip tool 13 in step S34, is used in step S41. In step S42 subsequent to step S41, a control of accelerating the rotating speed of the electric motor 12 by using the rotating speed switching time, which is set for each type of the tip tool 13 in step S34, to increase the rotating speed is executed. After step S42 is executed, the process proceeds to step S39.

On the other hand, When "NO" is determined in above-described step S37, the control of step S43 is executed. The control of step S43 is the same as that of step S27. When "NO" is determined in step S43, the process proceeds to step S39. When "YES" is determined in step S43, the control of step S44 is executed. The control of step S44 is the same as that of step S28. When "NO" is determined in step S44, the process proceeds to step S39. When "YES" is determined in step S44, the process proceeds to step S45.

The control of step S45 is the same as that of step S29, and the rotating speed of the no-load mode, which is set for each type of the tip tool 13 in step S34, is used. In step S46 subsequent to step S45, a control of reducing the rotating speed of the electric motor 12, in other words, a control of decelerating the rotating speed is executed according to the rotating speed switching time set in step S34. In other words, the control of switching the maximum rotating speed to the minimum rotating speed is completed by using the rotating speed switching time. After the control of step S46 is executed, the process proceeds to step S39.

Next, characteristics of the control of the rotating speed of the electric motor 12 will be explained on the basis of FIG. 11. When the minimum rotating speed is selected as the target rotating speed of the electric motor 12, the maximum vibration number of the tip tool 13 is 15,000 times per minute, and the maximum peripheral speed of the teeth 13c of the tip tool 13 is 16,000 m per minute. When the maximum rotating speed is selected as the target rotating speed of the electric motor 12, the maximum vibration number of the tip tool 13 is 18,000 to 20,000 times per minute, and the maximum peripheral speed of the teeth 13c of the tip tool 13 is 19,000 to 21,000 m per minute. The single time of the vibration number is one reciprocation of the tip tool 13 about the output shaft 22, and the peripheral speed is the moving speed of the teeth 13c on the basis of the center of the output shaft 22.

As described above, the electric power tool 11 can detect changes in the load and can automatically control the actual rotating speed of the electric motor 12 on the basis of the detection result, and vibrations and noise can be reduced. Particularly, since the rotating speed of the electric motor 12 is reduced in the case of the no-load mode, electric power consumption can be also reduced. When "switch control" is selected by operating the control switch 38, the maximum rotating sped is once selected as the target rotating speed of the electric motor 12, and the control of causing the actual rotating speed of the electric motor 12 to come close to the maximum rotating speed is automatically executed. Therefore, the operator can confirm the maximum rotating speed, which is set by operating the speed changing dial 19, by touch sensation and the movement of the tip tool 13.

Furthermore, when "switch control" is selected by operating the control switch 38, the maximum rotating speed is once selected as the target rotating speed of the electric motor 12, and then, the minimum rotating speed is selected as the target rotating speed of the electric motor 12. Therefore, the operator can easily align the teeth 13c of the tip tool 13 at the boundary part of the object and the body, and workability is improved.

When the load of the electric motor 12 is changed, the actual rotating speed of the electric motor 12 is automatically changed. Therefore, the operator is not bothered by switching of the actual rotating speed of the electric motor 12 in accordance with the load by a manual operation. Therefore, the electric power tool 11 is improved in operability and workability.

Furthermore, when the target rotating speed of the electric motor 12 is mutually switched between the minimum rotating speed and the maximum rotating speed, the target rotating speed is gradually changed to correspond to the change in the load of the electric motor 12; therefore, the target rotating speed can be prevented from being rapidly changed. Therefore, uncomfortable feelings of the operator can be avoided. Furthermore, the return action caused when the tip tool 13 digs into the object material can be reduced.

Furthermore, in accordance with the operation substance carried out by using the electric power tool 11, the operator can select "switch control" or "no switch control" by operating the control switch 38. For example, when an object is subjected to a polishing operation with the tip tool 13, "no switch control" can be selected by operating the control switch 38. As a result, even when the force of pushing the tip tool 13 against the object is changed by the intention of the operator and the load of the electric motor 12 is changed, the target rotating speed is maintained at the maximum rotating speed; therefore, the operator can be prevented from feeling the uncomfortable feelings.

Furthermore, when the operator operates the target-rotating speed adjusting part 39 to adjust the maximum rotating speed and the minimum rotating speed, the maximum vibration number of the tip tool 13 can be adjusted to the operation substance, and workability is further improved.

The present invention is not limited to the above-described first embodiment, and various modifications can be made within a range departing from the gist thereof. Examples of the electric power tool of the present invention include a structure in which electric power is supplied to the electric motor from an alternating-current power source via an electric power cord, and a structure which is provided with a battery pack attached to the housing and detachable from the housing, and supplies electric power to the electric motor from the battery pack. In the maps of FIGS. 5, 7, and 10, the maximum rotating speed and the minimum rotating speed can be changed in accordance with the operation position of the speed changing dial 19; however, regardless of the operation position of the speed changing dial 19, the minimum rotating speed can be the same. The sensor configured to identify the tip tool is composed of a switch and the like. The rotating speed of the electric motor may be used as the load of the tip tool.

Next, a second embodiment of detecting the load state of the electric motor, which is provided in the electric power tool of the present invention, with high precision will be explained with reference to the drawings.

Hereinafter, the second embodiment will be explained in detail.

<Configuration Example of Electric Power Tool>

Figure 12:
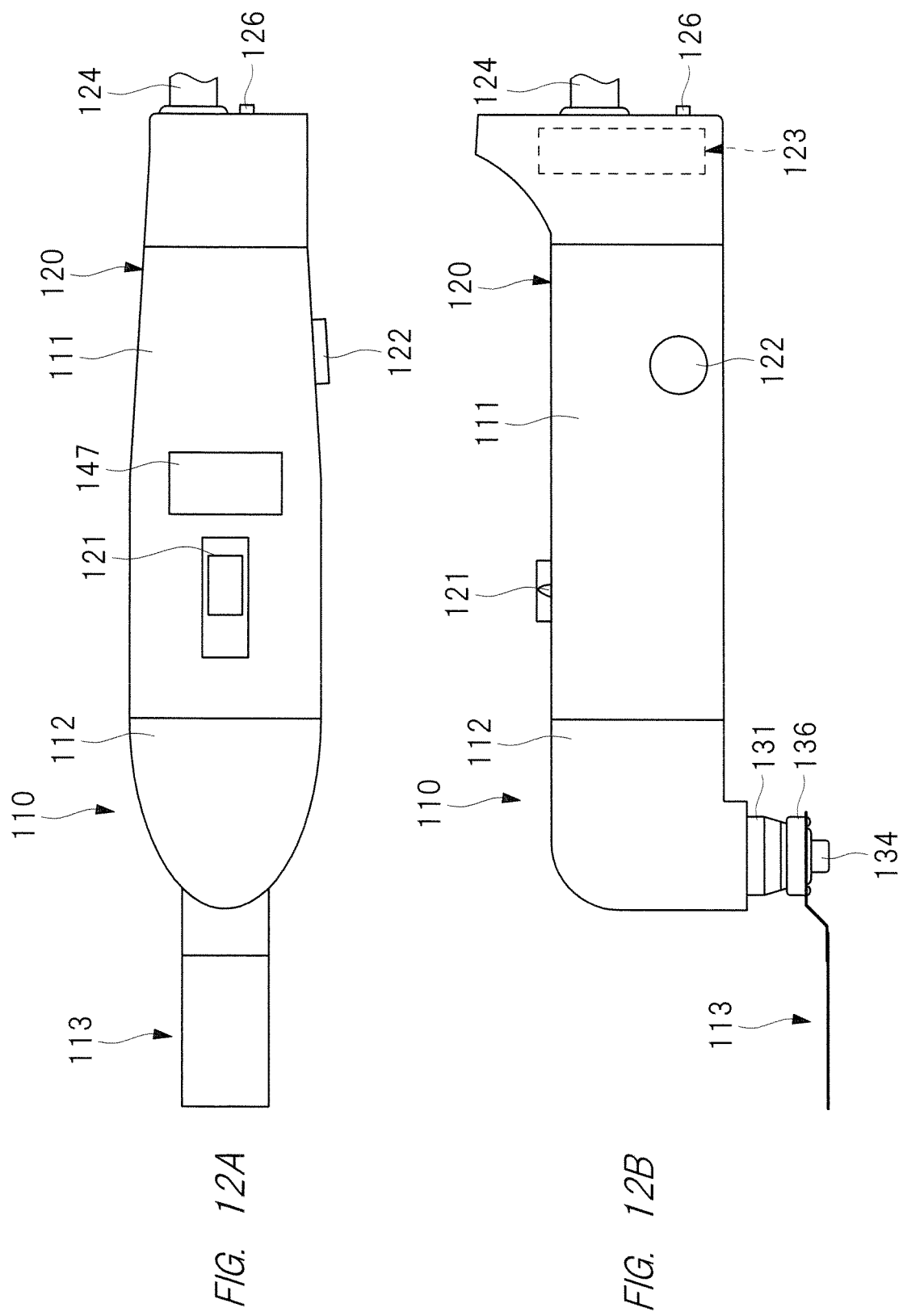
FIGS. 12A and 12B are external views showing an example of an electric power tool according to the second embodiment of the present invention.
Figure 13:
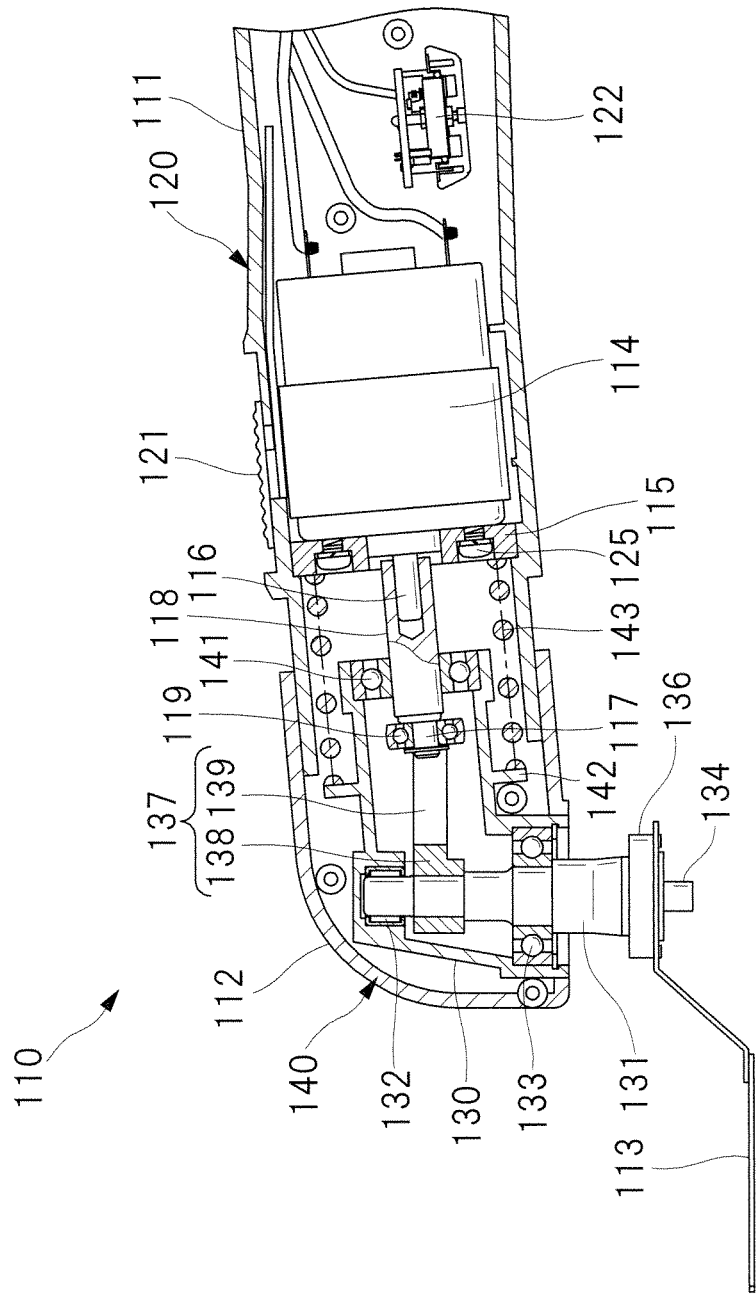
FIG. 13 is a sectional view of the electric power tool of FIG. 12.

FIGS. 12A and 12B are external views showing an example of an electric power tool according to the second embodiment. FIG. 13 is a sectional view of the electric power tool of FIGS. 12A and 12B.

An electric power tool 110 is a power tool using an electric motor 114 as a drive power source. With the electric power tool 110, various operations can be selectively carried out by changing a tip tool attached. In other words, a plurality of tip tools can be selectively attached and detachable from the electric power tool 110.

For example, when a tip tool provided with saw teeth is attached to the electric power tool 110, the electric power tool 110 can carry out an operation of cutting an object with the tip tool. When a tip tool to which a diamond chip or a carbide chip is fixed is attached to the electric power tool 110, the electric power tool 110 can carry out an operation of grinding or polishing an object with the tip tool. Furthermore, when a scraper-shaped tip tool or the like is attached to the electric power tool 110, an operation of peeling off an object from a body can be carried out with the tip tool. The tip tool provided with saw teeth corresponds to a first tool of the present invention. The tip tool to which a diamond chip, a carbide chip, or the like is fixed or the scraper-shaped tip tool corresponds to a second tool of the present invention. The electric power tool 110 shown in FIGS. 12A, 12B, and 13 is an example in which a scraper-shaped tip tool 113 is attached.

The electric power tool 110 has: a grip-part housing 111, which is held by the operator; and a front-side housing 112 which is slidably fitted on a tip part of the grip-part housing 111. The electric motor 114 serving as a drive source is housed in the grip-part housing 111. The electric motor 114 is fixed to a dividing wall part 115 of the grip-part housing 111 by attachment screws 125. The grip-part housing 111 has a display part 147. The display part 147 is composed of, for example, a liquid crystal display and displays a target rotating speed, an actual rotating speed, etc.

A spindle 118 provided with an eccentric shaft 117 at a tip is fixed to a motor shaft 116 of the electric motor 114. An inner race of a bearing 119 is fitted on and fixed to the eccentric shaft 117 of the spindle 118.

The electric motor 114, which is provided with the spindle 118 as described above, and the grip-part housing 111, which supports the electric motor 114, constitute a drive unit 120 of the electric power tool 110. The grip-part housing 111 is provided with: a main switch 121, which is operated by the operator when the electric power tool 110 is started; a rotating speed setting dial 122, which is operated by the operator when the motor rotating speed is adjusted; a control device 123, which controls the rotation of the electric motor 114; etc.

A power supply cord 124 is connected to a longitudinal direction end of the grip-part housing 111, and the electric power of an alternating-current power source 172 is supplied to the electric motor 114 via the power supply cord 124. In the grip-part housing 111, an automatic speed changing control switch 126 is provided below the power supply cord 124. The automatic speed changing control switch 126 is a switch for setting whether or not to allow the operator to sets whether or not automatic switching between a load mode and a no-load mode is carried out in accordance with the load of the electric motor 114. In the load mode, the electric motor 114 is at a maximum rotating speed, which is set by the rotating speed setting dial 112; and, in the no-load mode, the electric motor 114 is at a rotating speed which is about 80% of the maximum rotating speed. When the rotating speed in the case of the no-load mode is reduced, the tip tool can be easily brought into contact with an object.

An inner case 130 is housed in the front-side housing 112, and a pair of bearings 132 and 133 supports a vibration shaft 131 in the inner case 130. At a tip end of the vibration shaft 131 projecting from the front-side housing 112 and the inner case 130, a tool attaching part 136 to which the tip tool 113 is attached by using a fixing screw 134 is formed.

A swing arm 137 extending to the spindle 118 side is fixed at a base end part of the vibration shaft 131. The swing arm 137 is provided with a mating part 138, which is fixed to the vibration shaft 131, and a pair of arm pieces 139 divided into two and extending from the mating part 138 to the spindle 118 side.

In the inner side of the arm pieces 139, an outer race of the bearing 119 fixed to the eccentric shaft 117 is slidably housed. Thus, the pair of arm pieces 139 provided in the swing arm 137 functions as a housing part, which houses the eccentric shaft 117.

In this manner, the arm pieces 139 are provided at a first end side of the swing arm 137, and the mating part 138 is provided in a second end side of the swing arm 137. The vibration shaft 131 and the spindle 118 are coupled to each other via the swing arm 137 as described above.

The rotating motion of the spindle 118, i.e., the revolving motion of the eccentric shaft 117 is converted into swinging motion of reciprocating the vibration shaft 131 and the tip tool 113 at a predetermined angle via the swing arm 137. The vibration shaft 131, the swing arm 137, the inner case 130, and the front-side housing 112 as described above constitute a vibration unit 140 of the electric power tool 110. A bearing 141 supporting the spindle 118 is provided in the inner case 130, and the spindle 118 is movable in the axial direction with respect to the bearing 141.

A flange part 142 is formed on the inner case 130 of the vibration unit 140, and a coil spring 143 is attached between the flange part 142 and the dividing wall part 115 of the grip-part housing 111. The coil spring 143 is biased in the direction that separates the flange part 142 and the dividing wall part 115 from each other, in other words, in the direction that separates the drive unit 120 and the vibration unit 140 from each other.

When the drive unit 120 and the vibration unit 140 get away from each other, the bearing 119 which is in sliding contact with the arm pieces 139 of the swing arm 137 is moved in the direction in which it gets away from the vibration shaft 131. When the drive unit 120 and the vibration unit 140 get close to each other, the bearing 119 which is in sliding contact with the arm pieces 139 of the swing arm 137 is moved in the direction that it gets close to the vibration shaft 131.

Since the amplitude of the eccentric shaft 117 is constant, when the distance between the central axis of the vibration shaft 131 and the contact point of the bearing 119 with respect to the arm pieces 139 is increased, the vibration shaft 131 and the tip tool 113 vibrate at a small amplitude.

On the other hand, when the distance between the central axis of the vibration shaft 131 and the contact point of the bearing 119 with respect to the arm pieces 139 is reduced, the vibration shaft 131 and the tip tool 113 vibrate at an amplitude larger than the above-described amplitude. In this manner, the amplitude of the vibration shaft 131 and the tip tool 113 is continuously changed by changing the positional relation of the swing arm 137 and the eccentric shaft 117.

<Configuration Example of Control Device>

Figure 14:
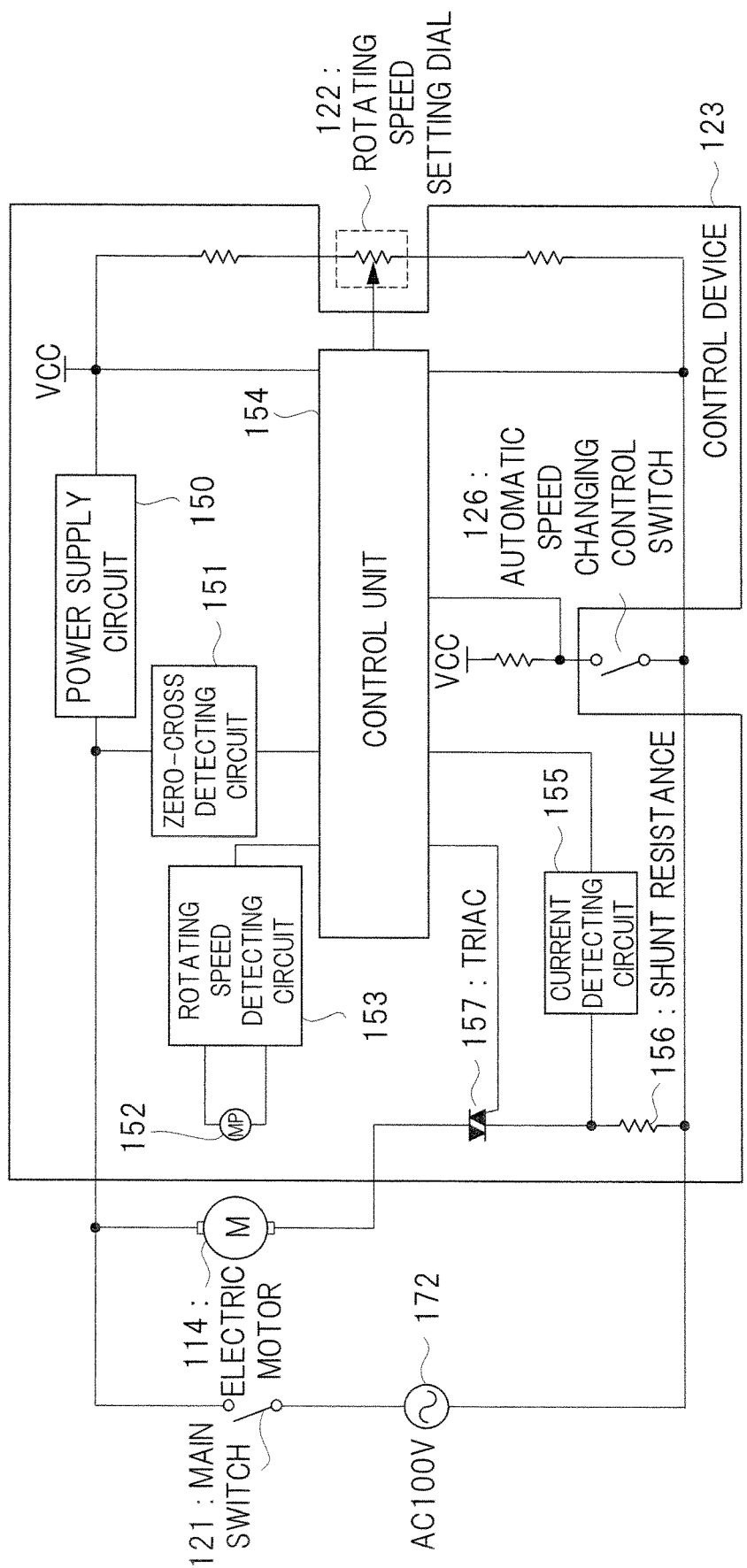
FIG. 14 is a block diagram showing a configuration example of a control device provided in the electric power tool of FIG. 13.

FIG. 14 is a block diagram showing a configuration example of the control device 123 provided in the electric power tool 110 of FIG. 13.

As shown in FIG. 14, the control device 123 has a power supply circuit 150, a zero-cross detecting circuit 151, a rotating speed pick-up sensor 152, a rotating speed detecting circuit 153, a control part 154, a current detecting circuit 155, a shunt resistance 156, a triac 157, etc.

when the main switch 121 is turned on, in other words, becomes a conduction state, in the control device 123, the electric power of the alternating-current power source 172 is supplied to the power supply circuit 150. The power supply circuit 150 generates a direct-current power-supply voltage VCC from the electric power of the alternating-current power source 172 supplied via the power supply cord 124 of FIG. 12, and supplies it as an operation power source of the control part 154. The zero-cross detecting circuit 151 detects a zero spot, in other words, a zero-cross point of the alternating-current power source 172.

The rotating speed pick-up sensor 152 is a sensor, which detects the rotating speed of the electric motor 114 of FIG. 13. The rotating speed pick-up sensor 152 is a sensor utilizing the Hall effect, and detects the presence or absence of a magnet attached to a rotating part of the electric motor 114.

The rotating speed detecting circuit 153, which is a rotating speed detecting part, calculates the rotating speed per unit time of the electric motor 114 from the detection result of the rotating speed pick-up sensor 152.

The shunt resistance 156 is a resistor, which detects the current flowing to the electric motor 114. The current detecting circuit 155 serving as a current detecting part detects the current flowing to the electric motor 114 on the basis of the voltage generated at the shunt resistance 156 and outputs the detection result thereof to the control part 154.

The triac 157, which is a switching element, controls the conduction angle at which a current flows from the alternating-current power source 172 to the electric motor 114 by carrying out on-and-off operations on the basis of a control signal output from the control part 154. The electric motor 114 has a rotor and a coil, and the conduction angle is a range of an electric angle at which a current flows to the coil. Thus, the triac 157 controls the alternating-current voltage applied to the electric motor 114. By virtue of this, the electric power supplied to the electric motor 114 is controlled, and the rotating speed is increased or educed.

The control part 154 is composed of, for example, a microcomputer. A setting signal set by the rotating speed setting dial 122 and a speed-changing control signal set by the automatic speed changing control switch 126 are input to the control part 154.

The control part 154 sets the maximum rotating speed of the electric motor 114 in accordance with the input setting signal. The automatic speed changing control switch 126 is a switch which sets whether automatic switching between the minimum rotating speed and the maximum rotating speed is carried out in accordance with the load of the electric motor 114. For example, when the operator turns on the automatic speed changing control switch 126, the control part 154 carries out a control of automatically switching the minimum rotating speed and the maximum rotating speed in accordance with the load of the electric motor 114. Specifically, according to the control signal output to the triac 157, on and off of the triac 157 is controlled so that the conduction angle is variable.

When the operator turns off the automatic speed changing control switch 126, the control part 154 controls on and off the triac 157 so that the maximum rotating speed is used regardless of the load of the electric motor 114.

Furthermore, the rotating speed of the electric motor 114 detected by the rotating speed detecting circuit 153 and the detection result of a zero-cross point detected by the zero-cross detecting circuit 151 are input to the control part 154. On the basis of the rotating speed of the electric motor 114 detected by the rotating speed detecting circuit 153, the control part 154 carries out a control so that the rotating speed of the electric motor 114 is approximately constant.

As described above, the control part 154 controls the rotating speed of the electric motor 114 by controlling the conduction angle of the triac 157. In the control of the rotating speed of the electric motor 114, for example, when the rotating speed of the electric motor 114 is larger than the rotating speed set by the rotating speed setting dial 122, the triac 157 is controlled so as to reduce the conduction angle. As a result, the voltage applied to the electric motor 114 is reduced, and the rotating speed of the electric motor 114 is reduced. When the rotating speed is smaller than the rotating speed set by the rotating speed setting dial 122, the triac 157 is controlled so s to increase the conduction angle. As a result, the voltage applied to the electric motor 114 is increased, and the rotating speed of the electric motor 114 is increased.

The control part 154 controls the power distribution timing of the triac 157 at the zero-cross point detected by the zero-cross detecting circuit 151. For example, when the conduction angle is 90°, in the phase angle of a sine wave, a control is carried out so that power distribution is carried out within the range from the point which has passed 90° from the zero-cross point detected by the zero-cross detecting circuit 15 to remaining 90°.

The control part 154 has a memory unit (not shown). The memory unit is composed of, for example, a non-volatile memory such as flash memory. The memory unit is configured to store a first judge reference table for judging whether the electric motor 114 is in a no-load state or in a load state.

<Configuration Example of First Judge Reference Table>

Figure 3:
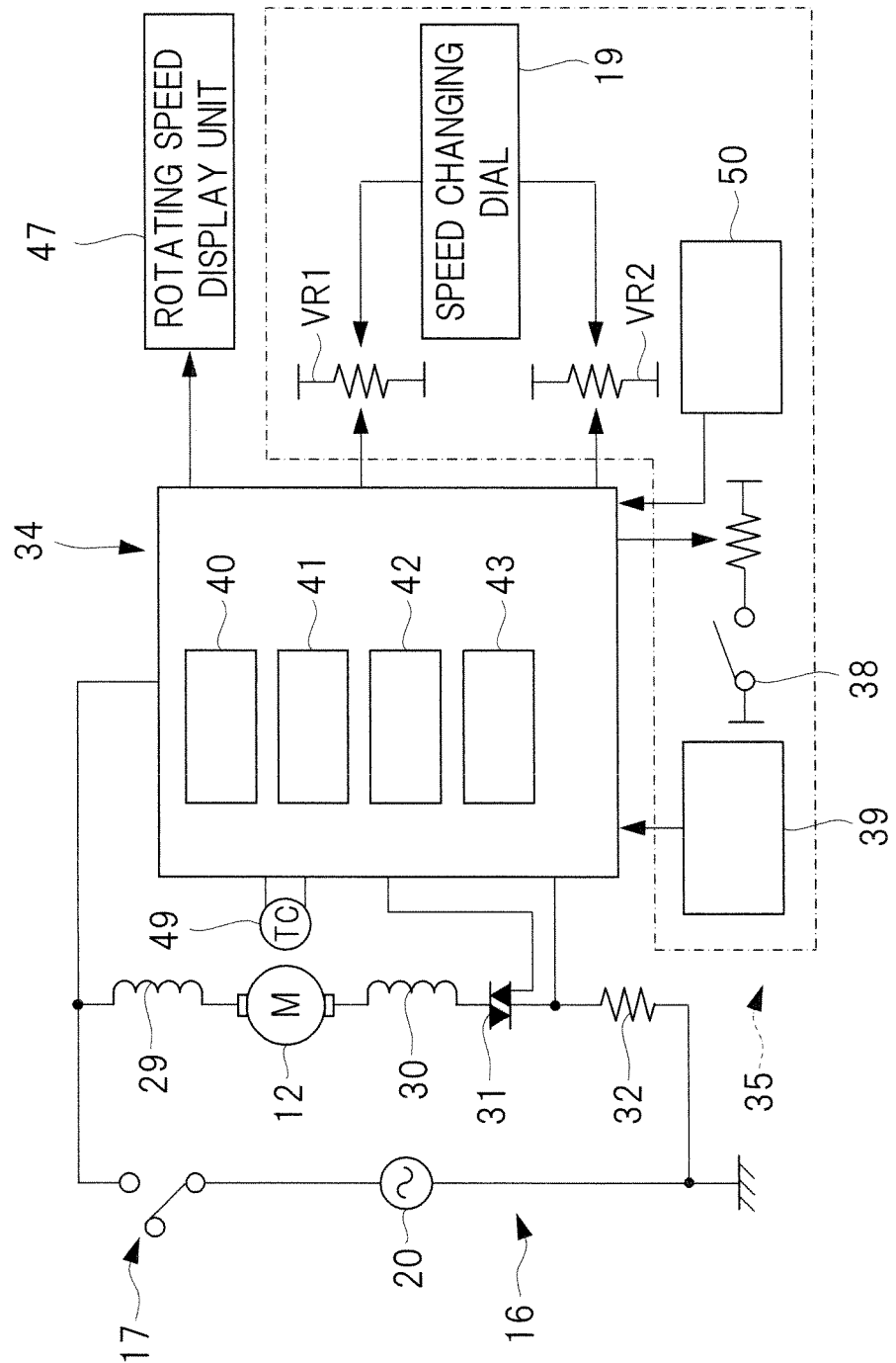
FIG. 3 is a block diagram showing a control system of the electric power tool of FIGS. 1A, 1B, and 2.

FIG. 15 is an explanatory drawing showing a configuration example of the first judge reference table "TB" stored in the control part 54 of FIG. 3. The first judge reference table "TB" is a reference for judging whether the electric motor 114 is in the no-load state or in the load state on the basis of the conduction angle of the triac 157.

The first judge reference table TB of FIG. 15 has rotating speed set values, load judge reference values, and no-load judge reference values. The rotating speed set value is a rotating speed set value of the electric motor 114 set by operating the rotating speed setting dial 122, in other words, a target rotating speed.

In the case of FIG. 15, the rotating speed set value set by the operation of the rotating speed setting dial 122 has five levels "1" to "5", and the greater the number, the greater the rotating speed of the electric motor 114, in other words, the rotating speed of the electric motor 114 becomes higher.

The load judge reference values are reference values of the conduction angle for judging that the electric motor 114 is in the load state, and the values to which a load judge conduction angle which is set in advance as an initial conduction angle are set. As the no-load judge reference, reference values of the conduction angle for judging that the electric motor 114 is in the no-load state which are the values to which a no-load judge conduction angle set in advance as an initial conduction angle is added are set.

The control part 154 references the first judge reference table TB shown in FIG. 15, and judges whether the electric motor 114 is in the load state or in the no-load state on the basis of the detected conduction angle of the triac 157. Then, the control part 154 executes a first automatic switching process on the basis of the judge result on whether the electric motor 114 is in the load state or in the no-load state. In controlling the rotating speed of the electric motor 114, the first automatic switching process is a process of controlling the rotating speed of the electric motor 114 by automatically switching the no-load mode and the load mode on the basis of the detection result of the conduction angle of the triac 157.

<Timing Example of First Automatic Switching Process>

Figure 16:
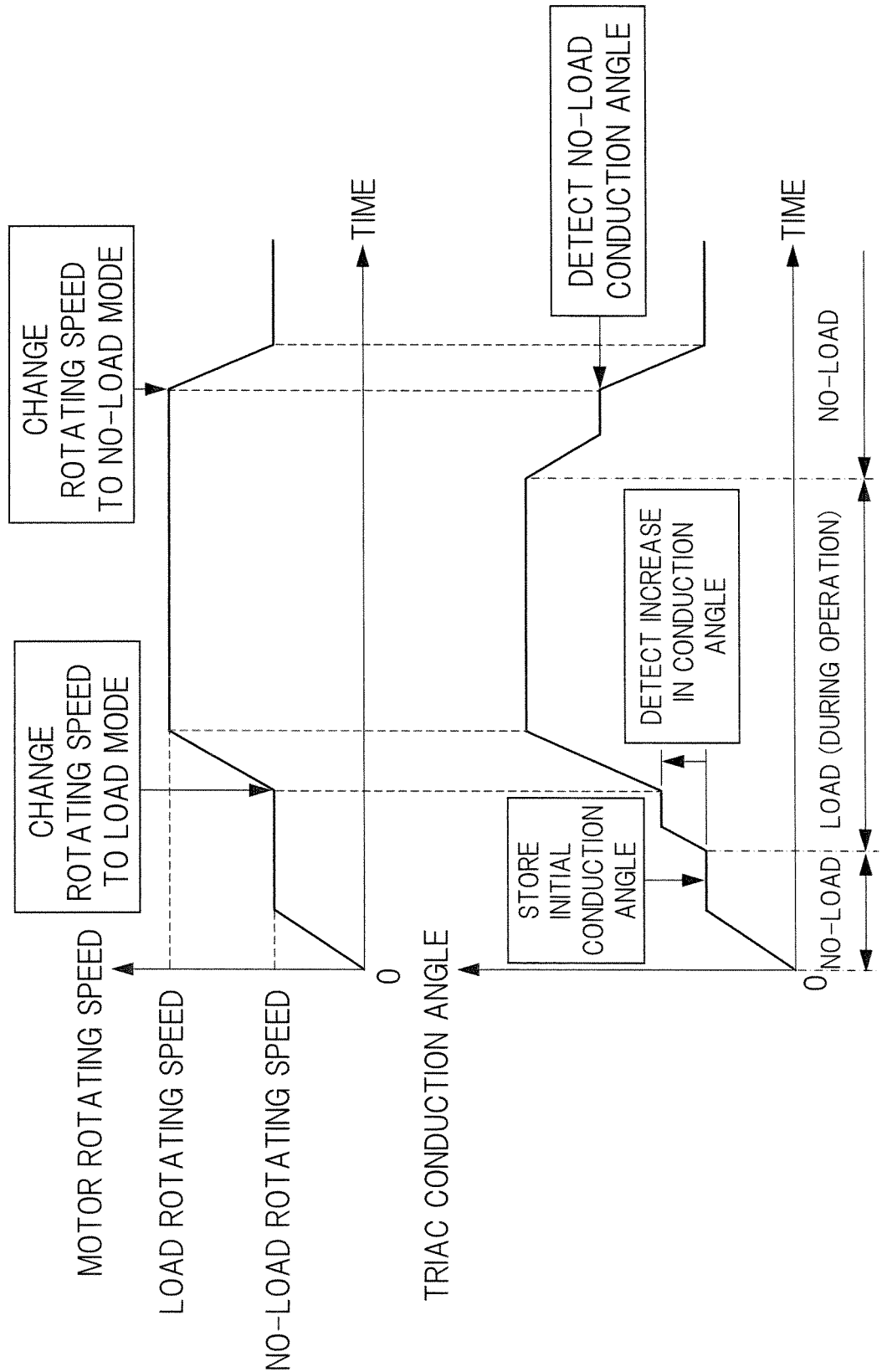
FIG. 16 is a timing chart showing an example of the rotating speed of an electric motor and the conduction angle of a triac in a first automatic switching process which is executed in the second embodiment of the present invention.

Subsequently, an outline of the first automatic switching process which is executed by the control part 154 will be explained with reference to FIG. 16. FIG. 16 is a timing chart showing an example of the rotating speed of the electric motor 114 and the conduction angle of the triac 157 in the first automatic switching process.

First, when the main switch 121 is turned on in a state in which no operation is being carried out by the electric power tool 110, the electric motor 114 starts, and the rotating speed of the electric motor 114 is controlled on the basis of the no-load mode. When the electric motor 114 becomes a stable state, the initial conduction angle of the triac 157 is stored. The no-load mode is a mode in which the electric motor 114 is rotated at about 80% of the maximum rotating speed set by the rotating speed setting dial 122. The stable state of the electric motor 114 is a state in which the rotating speed of the electric motor 114 detected by the rotating speed detecting circuit 153 has become the rotating speed set in the no-load mode.

Subsequently, when the electric power tool 110 starts an operation and the load of the electric motor 114 is increased, the control part 154 increases the conduction angle of the triac 157 in order to maintain the rotating speed of the electric motor 114 at the rotating speed corresponding to the load mode. When the conduction angle of the triac 157 is increased, the control part 154 carried out control of driving the electric motor 114 in the load mode. The load mode is a mode in which the electric motor 114 is rotated at the maximum rotating speed set by the rotating speed setting dial 122. The rotating speed of the electric motor 114 corresponding to the load mode is higher than the rotating speed of the electric motor 114 corresponding to the no-load mode.

When the operation of the electric power tool 110 is finished and the electric motor 114 becomes the no-load state, the load of the electric motor 114 is reduced; therefore, the control part 154 reduces the conduction angle of the triac 157 in order to maintain the rotating speed of the electric motor 114 at the rotating speed corresponding to the no-load mode.

When the conduction angle of the triac 157 is reduced and the electric motor 114 becomes the no-load state, the control part 154 carries out a control of driving the electric motor 114 in the no-load mode again.

In this manner, on the basis of the conduction angle of the triac 157, the detection is made on whether the electric motor 114 is in the load state or in the no-load state is detected. Therefore, detection errors caused by, for example, the type of the tip tool, the material of an operation object, or variations in motor characteristics can be reduced.

<Example of First Automatic Switching Process>

Figure 17:
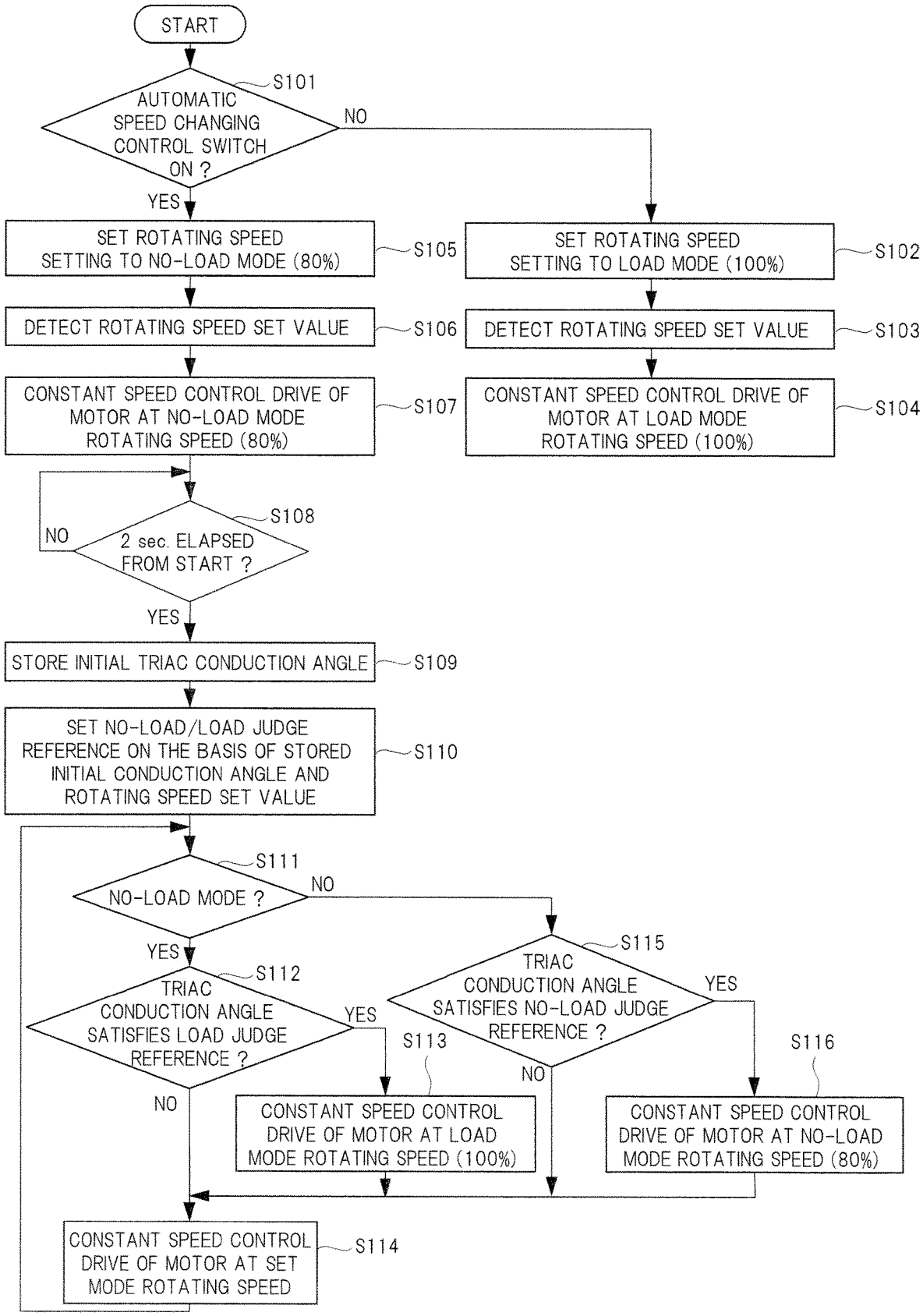
FIG. 17 is a flow chart showing an example of the first automatic switching process.

Subsequently, the first automatic switching process which is executed by the control part 154 will be explained hereinafter. FIG. 17 is a flow chart showing an example of the first automatic switching process which is executed by the control part 154.

First, in the state in which the main switch 121 is on, the control part 154 determines whether or not the automatic speed changing control switch 126 is on (step S101). When the automatic speed changing control switch 126 is off, the control part 154 sets the rotating speed setting of the electric motor 114 to the load mode (step S102). The load mode is a mode in which the electric motor 114 rotates at the maximum rotating speed set by the rotating speed setting dial 122 as described above.

Subsequently, the control part 154 detects the rotating speed set value of the electric motor 114 set by the rotating speed setting dial 122 (step S103); and the control part 154 controls the conduction angle of the triac 157 so that it becomes the maximum rotating speed of the detected rotating speed set value and carries out a control so that the electric motor 114 is at a constant rotating speed (step S104).

In the process of step S101, when the automatic speed changing control switch 126 is on, the control part 154 sets the rotating speed setting of the electric motor 114 to the no-load mode (step S105). The no-load mode is a mode in which the electric motor 114 rotates at about 80% of the maximum rotating speed set by the rotating speed setting dial 122 as described above.

Then, the control part 154 detects the rotating speed set value of the electric motor 114 set by the rotating speed setting dial 122 (step S106). Subsequently, the control part 54 controls the conduction angle by controlling the triac 157 so that the rotating speed of the electric motor 114 becomes the rotating speed which is 80% of the detected rotating speed set value and subjects the electric motor 114 to drive control at a constant rotating speed (step S107).

The control part 154 determines whether about 2 seconds have elapsed for stabilizing the rotating speed of the electric motor 114 after the electric motor 114 started rotating (step S108). When about two seconds have elapsed from the point when the electric motor 114 started rotating and the rotating speed of the electric motor 114 is stabilized, the conduction angle of the triac 157 to which power is distributed at the current point is stored in, for example, the memory unit as an initial conduction angle (step S109). In this manner, the control part 154 detects the initial conduction angle of the triac 157 after the electric motor 114 starts.

Subsequently, the control part 154 references the first judge reference table TB of FIG. 15 stored in the memory unit, reads the load judge reference value and the no-load judge reference value corresponding to the rotating speed set value detected in the process of step S106, and reads the initial conduction angle stored in the memory unit (step S110).

The first judge reference table TB, in advance, stores the load judge value which is an increased conduction angle corresponding to the rotating speed set value in the item of the load judge reference value and stores the no-load judge value which is an increased conduction angle corresponding to the rotating speed set value in the item of the no-load judge reference value.

The control part 154 adds each of the load judge value and the no-load judge value to the initial conduction angle detected in the process of step S109 and sets the addition results thereof as the item of the load judge reference value and the item of the on no-load judge reference value, respectively.

Then, the control part 154 judges whether the electric motor 114 is being driven in the no-load mode or not (step S111). In this case, in the first judge in step Sill, the no-load mode has been set in the process of step S105. Therefore, the process of step S112 is executed.

When the no-load mode is set for controlling the rotating speed of the electric motor 114, the control part 154 judges whether the conduction angle of the triac 157 satisfies the load judge reference value read in the process of step S110 during power distribution to the electric motor 114 (step S112).

For example, when the load judge reference value of the rotating speed set value "1" is read in the process of step S110, according to FIG. 15, the determination is made on whether the conduction angle controlled in the operation of the triac 157 is larger than "the initial conduction angle+0.10 ms" or not during power distribution to the electric motor 114.

If the conduction angle is larger than "the initial conduction angle+0.10 ms", the rotation load of the electric motor 114 is determined to have been increased, the conduction angle of the triac 157 is increased so as to drive the electric motor 114 in the load mode (step S113), and a constant rotating speed according to the load mode is maintained (step S114).

When the conduction angle of the triac 157 is smaller than "the initial conduction angle+0.10 ms", it is determined that the rotation load of the electric motor 114 has not been increased, and the drive according to the no-load mode is continued (step S114).

When the process of step S114 is finished, the process returns to step Sill again. When the load mode is set in the process of step S113, the mode is determined not to be the no-load mode in the process of step S111.

When it is not the no-load mode, the control part 154 judges whether the conduction angle of the triac 157 is larger than the no-load judge reference value read in the process of step S110 during power distribution to the electric motor 114 (step S115).

For example, when the no-load judge reference value of the rotating speed set value "1" is read in the process of step S110, according to FIG. 15, the judgment is made on whether the conduction angle of the triac 157 at the current point is larger than "the initial conduction angle+0.20 ms".

When the conduction angle of the triac 157 at the current point is larger than "the initial conduction angle+0.20 ms", it is judged that the electric motor 114 is in the load state, and the drive according to the load mode is continuously carried out (step S114).

When the conduction angle of the triac 157 at the current point is smaller than "the initial conduction angle+0.20 ms", it is judged that the electric motor 114 is in the no-load state, the electric motor 114 is switched to the drive according to the no-load mode (step S116), and a constant rotating speed according to the no-load mode is maintained (step S114). In this manner, when the electric motor 114 becomes the no-load state, the vibrations, noise, power consumption, etc. of the electric power tool 110 can be reduced by reducing the rotating speed of the electric motor 114.

Thereafter, the processes of steps S111 to S116 are repeatedly executed until the main switch 121 is turned off.

In the above-described manner, it is possible to detect whether the electric motor 114 is in the load state or in the no-load state with high precision.

Next, a third embodiment of the electric power tool 110 shown in FIG. 12 and FIG. 13 will be explained.

<Outline>

The above-described second embodiment employs the configuration in which the load state of the electric motor 114 is detected on the basis of the conduction angle of the triac 157. However, in the third embodiment, a technique in which the load state of the electric motor 114 is detected on the basis of the value indicative of the current flowing to the electric motor 114 instead of the conduction angle of the triac 157.

In this case, the control part 54 executes a second automatic switching process. The second automatic switching process is a process of judging whether the electric motor 114 is in the load state or in the no-load state on the basis of the value indicative of the current flowing to the electric motor 114, and on the basis of this judgment, switching a mode of controlling the rotating speed of the electric motor 114 to the no-load mode or the load mode.

Since the electric power tool 110 is similar in configuration to that of FIGS. 12A, 12B, and 13 in the above-described second embodiment, explanation thereof is omitted. The control device 123 provided in the electric power tool 110 is also similar in configuration to that of FIG. 14 in the above-described second embodiment.

The control device 123 is different from that of FIG. 14 in the above-described second embodiment in that a second judge reference table TB1 stored in the memory unit of the control part 154 is used when the second automatic switching process is executed. The second judge reference table TB1 is a reference for judging whether the electric motor 114 is in the no-load state or in the load state on the basis of the detection result of the current value.

<Configuration Example of Second Judge Reference Table>

FIG. 18 is an explanatory drawing showing a configuration example of the second judge reference table TB1 used for judging whether the electric motor 114 is in the no-load state or in the load state when the second automatic switching process is executed in the third embodiment.

The second judge reference table TB1 of FIG. 18 has rotating speed set values, current load judge reference values, and current no-load judge reference values. The rotating speed set value is a rotating speed set value of the electric motor 114 set by an operation of the rotating speed setting dial 122.

Also in this FIG. 18, as well as the case of FIG. 15, the rotating speed setting values set by the operation of the rotating speed setting dial 122 have five levels "1" to "5", and the larger the number, the larger the rotating speed of the electric motor 114.

The current load judge reference values are the reference values of the current for judging that the electric motor 114 is in the load state, and the values obtained by adding load judge current values set in advance to an initial current value are set. The current no-load judge reference values are the reference values of the current for judging that the electric motor 114 is in the no-load state, and the values obtained by adding the no-load judge current values set in advance to an initial current value are set. In this manner, the load judge reference value and the no-load judge reference value are set for each rotating speed of the electric motor 114.

The control part 154 references the second judge reference table TB of FIG. 18, executes the second automatic switching process of judging whether the electric motor 114 is in the load state or in the no-load state according to the detected current flowing to the electric motor 114, and switching the electric motor 114 to the no-load mode or the load mode on the basis of the judge result.

<Outline of Second Automatic Switching Process>

Figure 19:
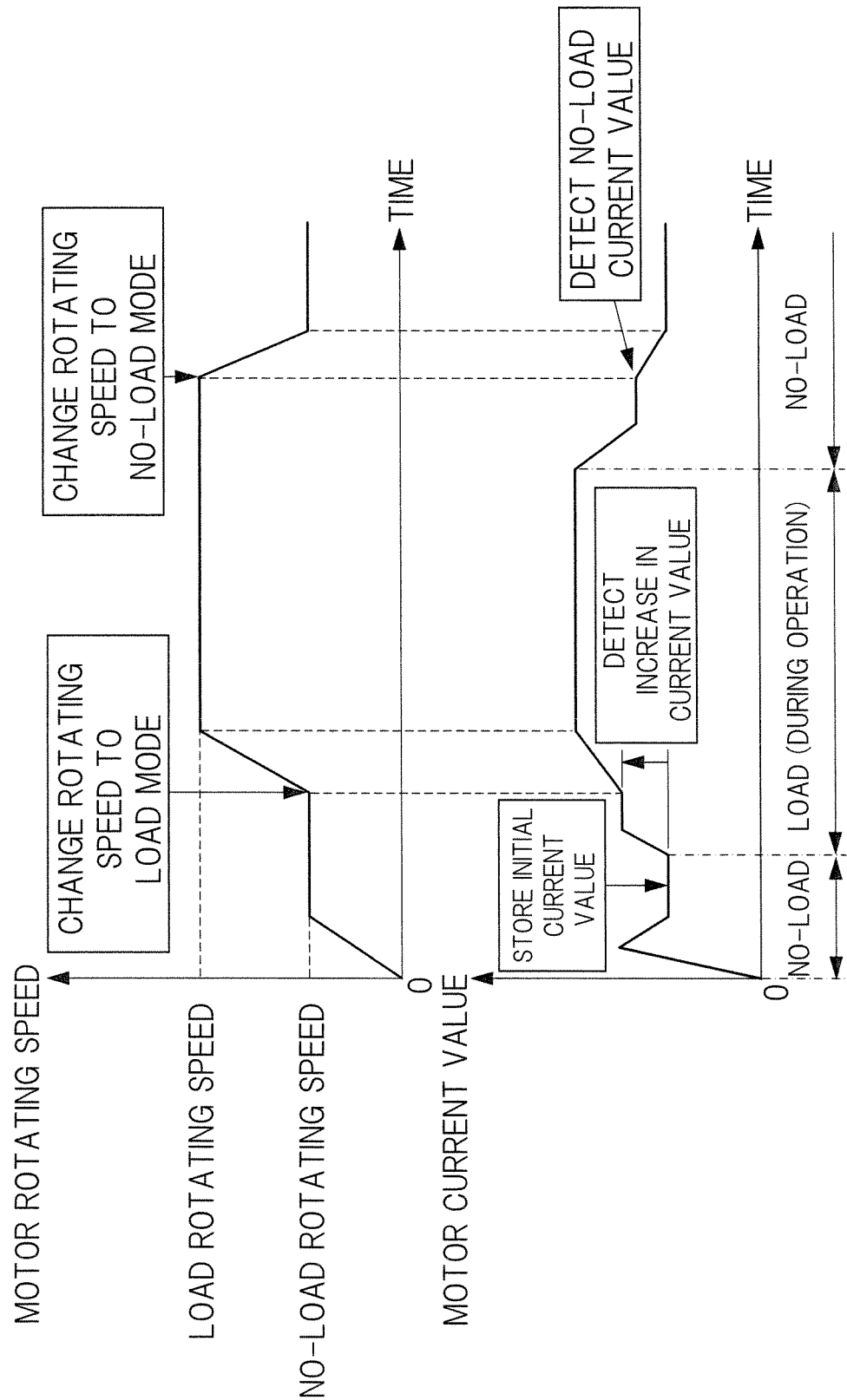
FIG. 19 is a timing chart showing an example of the rotating speed of the electric motor and the current flowing to the electric motor in a second automatic switching process.

Subsequently, an outline of the second automatic switching process which is executed by the control part 154 will be explained with reference to FIGS. 14 and 19. FIG. 19 is a timing chart showing an example of the rotating speed of the electric motor 114 and the currents flowing to the electric motor 114 in the second automatic switching process which is executed by the control part 154.

First, when the main switch 121 is turned on, the electric motor 114 is driven in the no-load mode. The no-load mode is a mode in which the electric motor 114 rotates at about 80% of the maximum rotating speed set by the operation of the rotating speed setting dial 122. Additionally, the temporary increase of the motor current at the time of no-load state, shown in FIG. 19, is a starting current. The initial current value has to be stored so as not to take the starting current into consideration. As described later, according to the third embodiment, the initial current value is stored after two seconds have elapsed from start of the electric motor 114.

Then, when the rotating speed of the electric motor 114 becomes a stable state, the value indicative of the initial current flowing to the electric motor 114 is obtained and stored. When the electric power tool 110 starts an operation and the load of the electric motor 114 is increased, the current flowing to the electric motor 114 is increased. When this increase in the current value is detected, the control part 154 carries out a control of driving the electric motor 114 in the load mode. The load mode is a mode in which the electric motor 114 is rotated at the maximum rotating speed set by the operation of the rotating speed setting dial 122.

When the operation of the electric power tool 110 is finished and the electric motor 114 becomes the no-load state, the load of the electric motor 114 is reduced, and, therefore, the current flowing to the electric motor 114 is also reduced.

As a result, it is judged that the electric motor 114 has become the no-load state, and the control part 154 carries out a control of driving the electric motor 114 in the no-load mode again.

In this manner, whether the electric motor 114 is in the load state or not can be detected on the basis of the current flowing to the electric motor 114. In this case, whether the electric motor 114 is in the load state or in the no-load state is detected according to the increase/reduction in the current with respect to the initial current flowing to the electric motor 114. Therefore, detection errors can be reduced regardless of, for example, variations in the individual characteristics of the electric motor 114.

<Example of Second Automatic Switching Process>

Subsequently, the second automatic switching process which is executed by the control part 154 will be explained.

Figure 20:
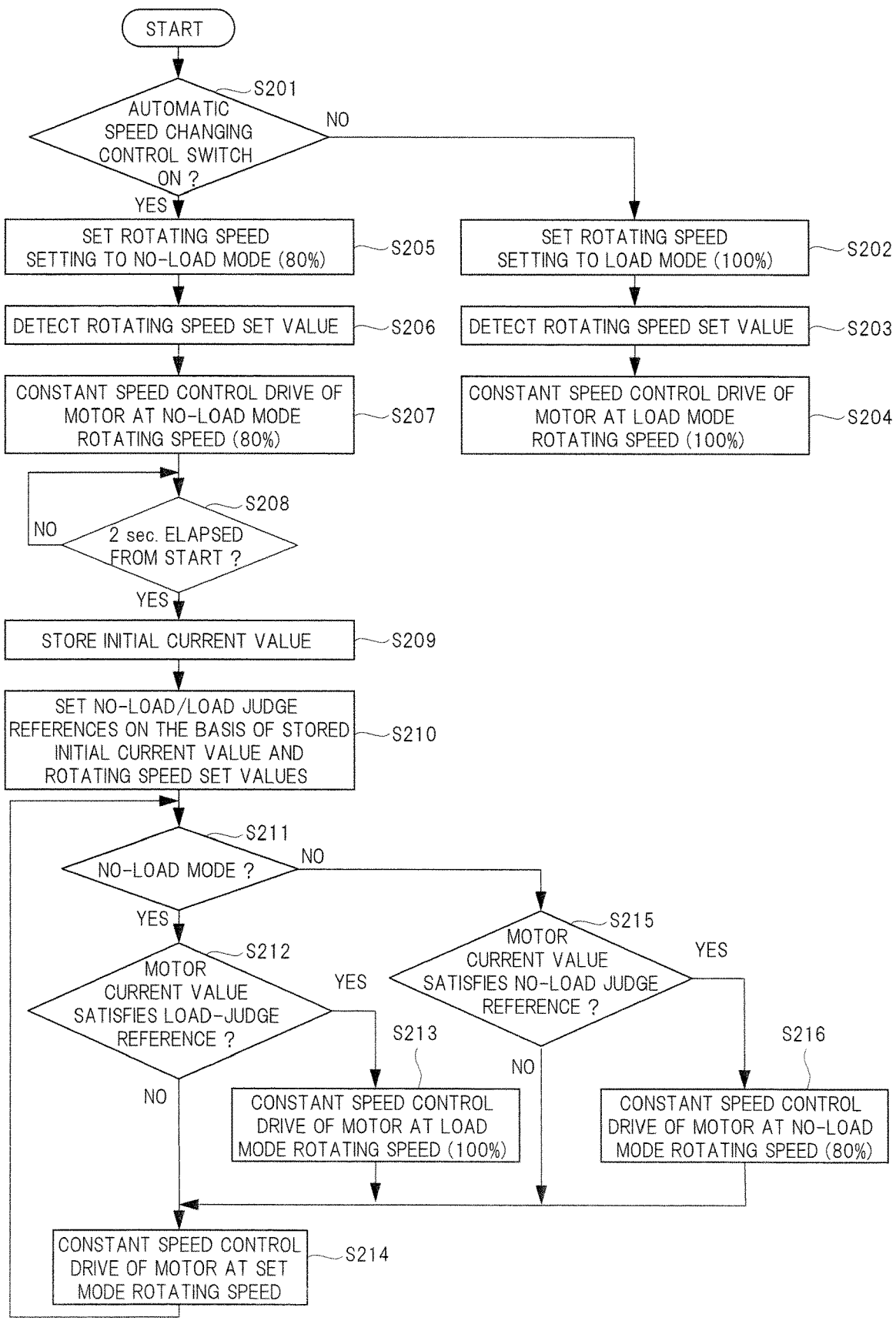
FIG. 20 is a flow chart showing an example of the second automatic switching process.

FIG. 20 is a flow chart showing an example of the second automatic switching process which is executed by the control part 154.

First, the control part 154 determines whether the automatic speed changing control switch 126 is on or not in the state in which the main switch 121 is on (step S201). When the automatic speed changing control switch 126 is off, the control part 154 sets the rotating speed setting of the electric motor 114 to the load mode (step S202).

Subsequently, the control part 154 detects the rotating speed set value of the electric motor 14 set by the operation of the rotating speed setting dial 122 (step S203); and the conduction angle of the triac 157 is controlled so that the rotating speed of the electric motor 114 detected by the rotating speed detecting circuit 153 becomes the maximum rotating speed of the rotating speed set value detected in step S203, and the electric motor 114 is controlled at a constant rotating speed (step S204).

When the automatic speed changing control switch 126 is on in the process of step S201, the control part 164 sets the rotating speed setting of the electric motor 114 to the no-load mode (step S205).

Then, the control part 154 detects the rotating speed set value of the electric motor 114 set by the operation of the rotating speed setting dial 122 (step S206); and, then, the control part 154 controls the conduction angle of the triac 157 so that the rotating speed of the electric motor 114 becomes the rotating speed which is 80% of the detected rotating speed set value and subjects the electric motor 114 to drive control so as to obtain a constant rotating speed (step S207).

Subsequently, after the electric motor 114 starts a rotating operation, the control part 154 judges whether about 2 seconds have elapsed (step S208). When about 2 seconds have elapsed after the electric motor 114 started rotation and when the rotating speed of the electric motor 114 is stabilized, the current value detected by the current detecting circuit 155 during the rotation of the electric motor 114 is stored in, for example, the memory unit of the control part 154 as an initial current value (step S209).

The control part 154 references the second judge reference table TB1 stored in the memory unit, reads the current load judge reference value and the current no-load judge reference value corresponding to the rotating speed set value detected in the process of step S206 and reads the initial current value stored in the memory unit (step S210).

The second judge reference table TB1, in advance, sets the load judge current values, which are the increased current values corresponding to the rotating speed set values, in the item of the current load judge reference values and sets the no-load judge current values, which are the increased current values corresponding to the rotating speed set values, in the item of the current no-load judge reference values.

The control part 154 adds each of the load judge current values and the no-load judge current values to the detected initial current value and sets the addition results in the item of the current-load judge reference values and in the item of the current no-load judge reference values.

Then, the control part 154 judges whether or not the electric motor 114 is being driven in the no-load mode (step S211). In this case, in the first judge in the process of step S211, the no-load mode has been set in the process of step S205. Therefore, the process of step S212 is executed.

When the no-load mode is set, the control part 154 judges whether the current value flowing to the electric motor 114, which is being driven, satisfies the current load judge reference value read in the process of step S210 or not (step S212).

For example, when the current load judge reference value of the rotating speed set value "1" is read in the process of step S210, the second judge reference table TB1 shown in FIG. 18 is referenced, and whether the value of the current flowing to the electric motor 114, which is being driven is larger than "the initial current value+0.5 A" or not is judged.

When the current value flowing to the electric motor 114 is larger than "the initial current value+0.5 A", it is determined that the rotation load of the electric motor 114 has been increased, the conduction angle of the triac 157 is increased so as to drive the electric motor 114 in the load mode (step S213), and a constant rotating speed according to the load mode is maintained (step S214).

On the other hand, when the value of the current flowing to the electric motor 114 is smaller than "the initial current value+0.5 A", it is determined that the rotation load of the electric motor 114 has not been increased, and drive of the electric motor 114 according to the no-load mode is continued (step S214).

When the process of step S214 is finished, the process returns to the process of step S211 again. When the load mode is set in the process of step S213, it is judged that the mode is not the no-load mode in the process of step S211.

When it is not the no-load mode, the control part 154 judges whether the value of the current flowing to the electric motor 114, which is being driven, is larger than the current no-load judge reference value read in the process of step S210 or not (step S215).

For example, when the current no-load judge reference value of the rotating speed set value "1" has been read in the process of step S210, according to FIG. 18, whether the value of the current flowing to the electric motor 114, which is being driven, is larger than "the initial current value+1.0 A" or not is judged.

When the value of the current flowing to the electric motor 114 is larger than "the initial current value+1.0 A", it is judged that the electric motor 114 is in the load state, and drive of the electric motor 114 according to the load mode is subsequently carried out (step S214).

When the value of the current flowing to the electric motor 114 is smaller than "the initial current value+1.0 A", it is judged that the electric motor 114 is in the no-load state, and the rotating speed of the electric motor 114 is controlled in the no-load mode (step S216); and control of maintaining the rotating speed of the electric motor 114 at the rotating speed set in the no-load mode is carried out (step S214).

Thereafter, until the main switch 121 is turned off, the processes of steps S211 to S216 are repeatedly executed.

In this manner, when the electric motor 114 becomes the no-load state, the vibrations, noise, power consumption, etc. of the electric power tool 110 can be reduced by reducing the rotating speed of the electric motor 114.

As described above, it is possible to detect whether the electric motor 114 is in the load state or the no-load state can be detected with high precision.

Next, a fourth embodiment of the electric power tool 110 of FIG. 12 and FIG. 13 will be explained.

<Outline>

In the above-described second and third embodiments, the operator sets the rotating speed of the electric motor 114 by operating the rotating speed setting dial 122. On the other hand, in the fourth embodiment, the rotating speed of the electric motor 114 can be controlled by executing a third automatic switching process by the control part 154. In the third automatic switching process, the control part 154 judges the load state of the electric motor 114 on the basis of the conduction angle of the triac 157, and the rotating speed of the electric motor 114 is controlled on the basis of the judge result thereof.

The electric power tool 110 of the fourth embodiment is different in that the rotating speed setting dial 122 and the automatic speed changing control switch 126 shown in FIGS. 12A, 12B, and 13 of the above-described second embodiment are not provided. The configuration other than that is similar to the configuration shown in FIGS. 12A, 12B, and 13 of the above-described second embodiment, and the explanation thereof is therefore omitted.

The configuration of the control device 123 provided in the electric power tool 110 is also similar to that of FIG. 14 of the above-described second embodiment. In the control device 123 of FIG. 14, a first load rotating speed table TB2 serving as a load rotating speed table and a third judge reference table TB3 are stored in the memory unit of the control part 154 in order to execute the third automatic switching process.

<Configuration Example of First Load Rotating Speed Table>

FIG. 21 is an explanatory drawing showing a configuration example of the first load rotating speed table TB2 used in the third automatic switching process which is executed by the control part 154, and FIG. 22 is an explanatory drawing showing a configuration example of the third judge reference table TB3 used in the third automatic switching process which is executed by the control part 154.

The first load rotating speed table TB2 is the information for determining the rotating speed of the electric motor 114 in accordance with the load state of the electric motor 114 and shows the relations of initial conduction angles, conduction-angle increments, and the rotating speed of the electric motor 114 as shown in FIG. 21.

In the first load rotating speed table TB2, the initial conduction angles are divided into, for example, five ranges, wherein the larger the initial conduction angle, the more the rotating speed of the electric motor 114 is increased. The conduction-angle increments are divided into, for example, four ranges, wherein the larger the conduction-angle increments, the more the rotating speed of the electric motor is increased.

Therefore, in the first load rotating speed table TB2, the electric motor 114 is at the maximum rotating speed when the initial conduction angle and the conduction-angle increment are the largest, and the electric motor 114 is at the minimum rotating speed when the initial conduction angle and the conduction-angle increments are the smallest.

When the electric motor 114 is in the load state, the control part 154 references the first load rotating speed table TB2 and sets an optimum rotating speed in accordance with the load state of the electric motor 114.

As shown in FIG. 22, the third judge reference table TB3 has the load rotating speeds and the no-load judge reference values. The no-load judge reference values are the reference values of the conduction angle for judging that the electric motor 114 is in the no-load state in accordance with the rotating speed of the electric motor 114, and the values obtained by adding the no-load judge conduction angles set in advance to the initial conduction angle are set. The control part 154 references the third judge reference table TB3 and judges whether or not the electric motor 114 is in the no-load state.

<Outline of Third Automatic Switching Process>

Figure 23:
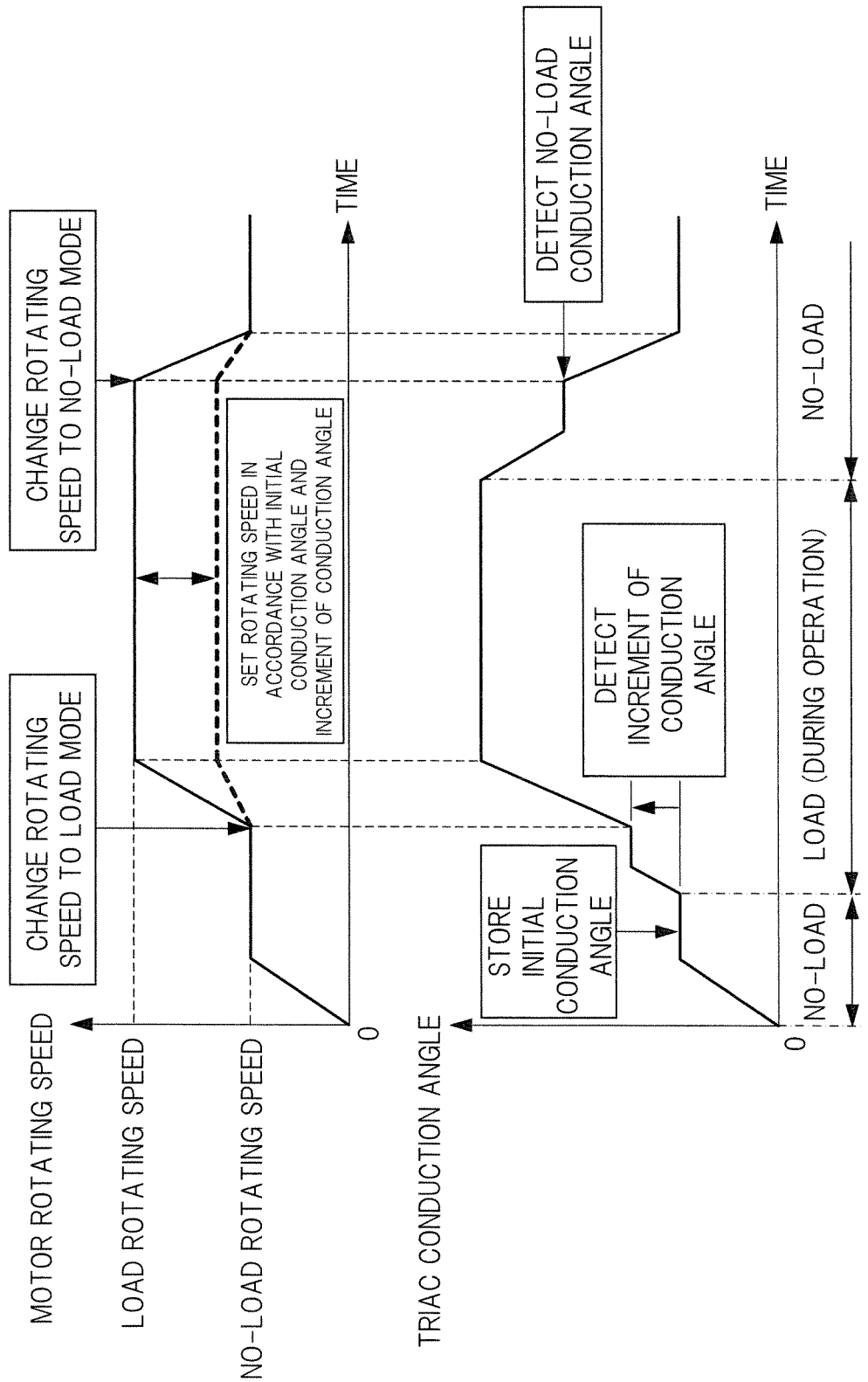
FIG. 23 is a timing chart showing an example of the rotating speed of an electric motor and the conduction angle of a triac in a third automatic switching process which is executed in the fourth embodiment of the present invention.

Subsequently, an outline of the third automatic switching process which is executed by the control part 154 will be explained with reference to FIGS. 14 and 23. FIG. 23 is a timing chart showing an example of the rotating speed of the electric motor 114 and the conduction angle of the triac 157 in a case when the control part 154 executes the third automatic switching process in the fourth embodiment.

First, when the main switch 121 is turned on when the electric motor 110 is not operating, the electric motor 114 is driven according to the no-load mode. Then, when the rotating speed of the electric motor 114 becomes a stable state, the initial conduction angle of the triac 157 is stored.

Subsequently, when the electric power tool 110 starts an operation and the load of the electric motor 114 is increased, the control part 154 increases the conduction angle of the triac 157 in order to maintain the rotating speed of the electric motor 114. By increasing the conduction angle to be larger than the initial conduction angle, the control part 154 carries out a control of driving the electric motor 114 in the load mode.

In the drive in the load mode, on the basis of the first load rotating speed table TB2 shown in FIG. 21, a rotating speed optimally selected in accordance with the initial conduction angle and the load state of the electric motor 114 is set.

Then, when the control part 154 judges that the operation of the electric power tool 110 has finished the operation and that the electric motor 114 is in the no-load state on the basis of the third judge reference table TB3 of FIG. 22, the control part reduces the conduction angle of the triac 157, drives the electric motor 114 in the no-load mode, and maintains the rotating speed of the electric motor 114.

In this manner, by minutely controlling the rotating speed of the electric motor 114 by controlling the conduction angle of the triac 157, the vibrations, noise, power consumption, etc. of the electric power tool 110 can be reduced.

Since the rotating speed optimally selected in accordance with the load sate of the electric motor 114 is set, when a soft material such as foamed polystyrene is cut, the load applied to the electric motor 114 is extremely small, and the rotating speed of the electric motor 114 is therefore reduced in accordance with that. By virtue of this, for example, the member can be prevented from being melted due to frictions upon cutting.

On the other hand, when a hard material such as metal is cut, the load applied to the electric motor 114 becomes extremely large. Therefore, the rotating speed of the electric motor 114 is increased, and cutting efficiency of a hard material such as metal can be improved.

<Example of Third Automatic Switching Process>

Subsequently, the third automatic switching process which is executed by the control part 154 will be explained.

Figure 24:
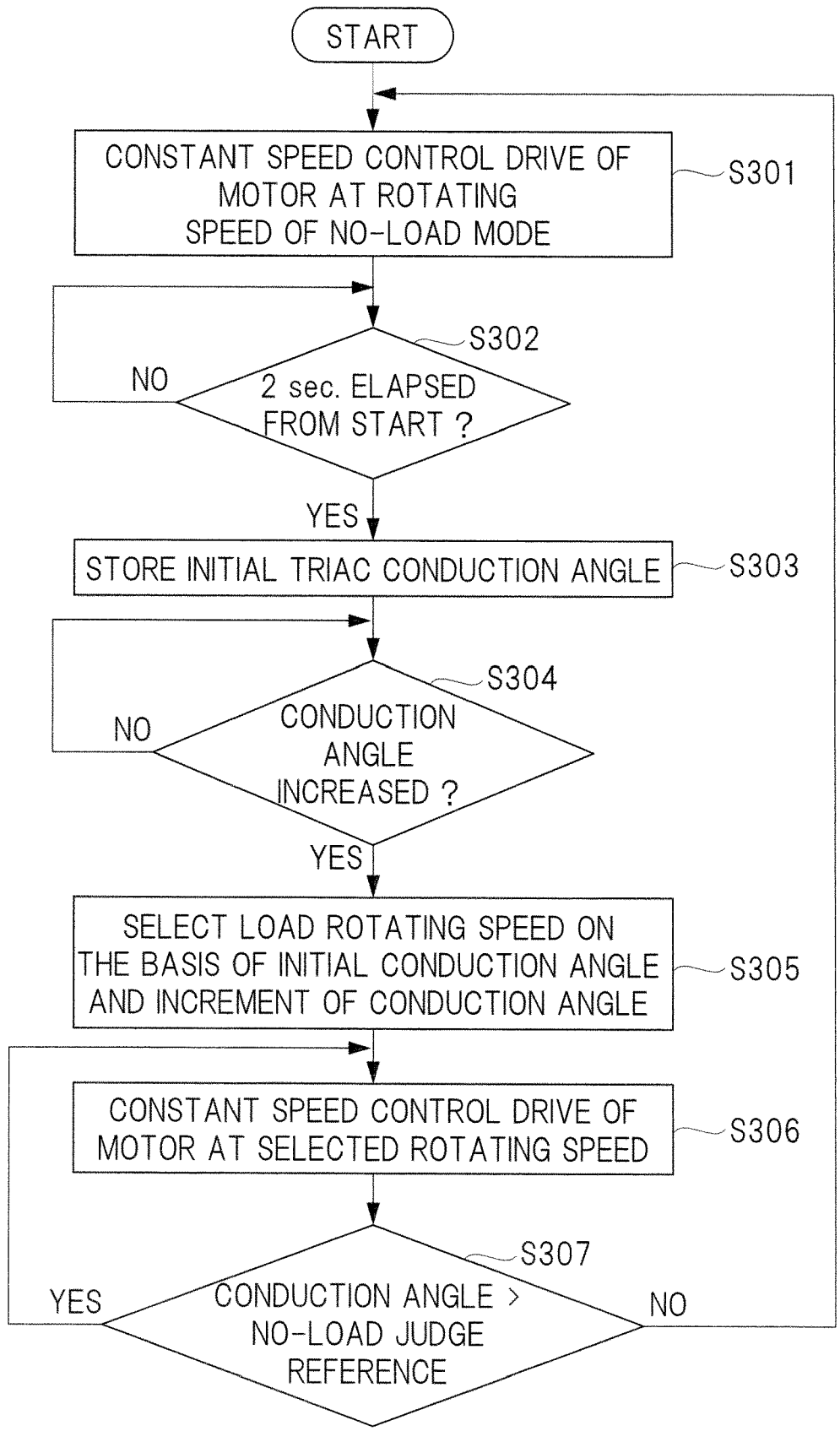
FIG. 24 is a flow chart showing an example of the third automatic switching process.

FIG. 24 is a flow chart showing an example of the third automatic switching process which is executed by the control part 154.

When the main switch 121 is turned on, the control part 154 causes the electric motor 114 to rotate according to the no-load mode (step S301). The rotating speed of the electric motor 114 in the no-load mode is the rotating speed which is lower than 4000 rpm, which is the lowest rotating speed in the load mode shown in FIG. 21, for example by about 20%. In this case, 4000 rpm corresponds to a first rotating speed of the present invention, and the rotating speed which is lower than 4000 rpm for example by about 20% corresponds to a second rotating speed of the present invention.

The control part 154 judges whether about 2 seconds have elapsed after the electric motor 114 started rotating (step S302). When about 2 seconds have elapsed after the electric motor 114 started rotating and when the rotating speed of the electric motor 114 is stabilized, the conduction angle of the triac 157 at the current point is stored in, for example, the memory unit of the control part 154 as the initial conduction angle (step S303).

Then, the control part 154 judges whether the conduction angle of the triac 157 has been increased from the initial conduction angle or not (step S304). When the conduction angle becomes larger than the initial conduction angle, the control part 154 selects the rotating speed of the electric motor 114 on the basis of the initial conduction angle and the conduction angle after the increase on the basis of the first load rotating speed table TB2 stored in the memory unit (step S305).

The control part 154 carries out a drive control of the electric motor 114 so as to maintain the rotating speed selected in the process of step S305 (step S306). As a result, the rotating speed corresponding to the state of load is set as the rotating speed of the electric motor 114.

In an operation of cutting metal such as iron with the electric power tool 110, the load applied to the electric motor 114 is increased compared with an operation such as polishing. Furthermore, there is a tendency that, as the load is increased in the electric power tool 110, the weight of the attached tip tool 113 is increased. In an operation of cutting hard metal such as iron with the electric power tool 110, the material of the tip tool 113 is also made of metal to correspond to that, and it becomes heavy.

Therefore, the larger the weight of the tip tool 113, the larger the inertia caused when the tip tool 113 is moved. When the inertia of the tip tool 113 is increased, the initial conduction angle is increased in order to maintain the rotating speed of the electric motor 114 in the case of the no-load mode. According to this, it is expected that the larger the inertia of the tip tool 113 attached to the electric power tool 110, the larger the load applied to the electric motor 114.

Therefore, it is expected that the larger the initial conduction angle, the larger the load applied to the electric motor 114 in the carried out operation; and, even in a case in which the increment of the conduction angle is the same value, control is carried out so that the larger the initial conduction angle of the no-load mode, the higher the rotating speed of the electric motor 114 in the load mode.

A case in which the inertia of the tip tool 113 was small and the initial conduction angle was, for example, 1.0 ms and a case in which the inertia of the tip tool 113 was large and the initial conduction angle was, for example, 8.0 ms will be discussed.

When the increment of the conduction angle is, for example, 0.3 ms in the case in which the initial conduction angle is 1.0 ms, the rotating speed of the electric motor 114 in the load mode is set to 6000 rpm according to the first load rotating speed table TB2 shown in FIG. 21. Therefore, control part 154 controls the conduction angle of the triac 157 so that the rotating speed of the electric motor 114 is maintained at 6000 rpm.

On the other hand, when the increment of the conduction angle is, for example, 0.3 ms as well as the above description in the case in which the initial conduction angle is 8.0 ms, in this case, the rotating speed of the electric motor 114 in the load mode is set to 14000 rpm according to the first load rotating speed table TB2 shown in FIG. 21. Therefore, the control part 154 controls the conduction angle so that the rotating speed of the electric motor 114 is maintained at 14000 rpm.

In this manner, the control of changing the rotating speed of the electric motor 114 in the load mode is carried out in accordance with the inertia of the attached tip tool 113. More specifically, when the rotating speed of the electric motor 114 is controlled in the no-load mode, the inertia caused during the operation of the tip tool 113 is judged; and, when the electric motor 114 is controlled in the load mode after the judgment, the control of the triac 157 is changed on the basis of the judge result of the inertia. As a result, an optimum rotating speed is obtained in accordance with the load of the electric motor 114 in the operation of the electric power tool 110. Therefore, insufficient power, excessive force application to an object, etc. during the operation of the electric power tool 110 can be prevented.

Subsequently, the control part 154 references the third judge reference table TB3 shown in FIG. 22 and judges whether or not the conduction angle at the rotating speed of the electric motor 114 at the current point is larger than the no-load judge reference value, which is corresponding to the rotating speed of the electric motor 114 (step S307).

For example, when the rotating speed of the electric motor 114 is set at 6000 rpm in the above-described manner in the process of step S305, the no-load judge reference value is "the initial conduction angle+0.40 ms" according to the third judge reference table TB3. Therefore, in the process of step S307, during power is being distributed to the electric motor 114, the judgment is made on whether or not the conduction angle of the triac 157 is larger than "the initial conduction angle+0.40 ms".

In the process of step S307, when the conduction angle is larger than the no-load judge reference value, a state that load is applied to the electric motor 114 is determined, and the process returns to the process of step S306.

In the process of step S307, when the conduction angle is smaller than the no-load judge reference value, a state that load is not applied to the electric motor 114 is determined, and the process returns to the process of step S301.

As described above, the load of the electric motor 114 can be judged on the basis of the conduction angle controlled by the operation of the triac 157, and the rotating speed of the electric motor 114 can be controlled to an optimum rotating speed on the basis of the judge result. Therefore, the vibrations, noise, power consumption, etc. of the electric power tool 110 can be reduced. Furthermore, in the electric power tool 110 to which the various tip tools 113 can be attached in accordance with operation uses such as cutting, peel-off, and polishing, an optimum rotating speed can be set at the electric motor 114 in accordance with the inertia in the operation of the tip tool 113.

Next, a fifth embodiment of the electric power tool 110 of FIGS. 12A, 12B, and 13 will be explained.

<Outline>

In the above-described fourth embodiment, the technique of selecting and setting the optimum rotating speed matching the load state of the electric motor 114 on the basis of the conduction angle has been described. On the other hand, in the fifth embodiment, a technique of selecting an optimum rotating speed matching the load state of the electric motor 114 on the basis of the value of the current flowing to the electric motor 114 will be described.

In the fifth embodiment, a fourth automatic switching process of automatically selecting the rotating speed of the electric motor 114 is executed in accordance with the load of the electric motor 114. The fourth automatic switching process is different from the third automatic switching process explained in the above-described fourth embodiment in that the load of the electric motor 114 is judged according to the value of the current flowing to the electric motor 114 instead of the conduction angle and that the rotating speed of the electric motor 114 is set on the basis of the judge result of the load.

The electric power tool 110 of the fifth embodiment is similar to that of FIGS. 12A, 12B, and 13 of the above-described fourth embodiment, and the configuration of the control device 123 is also similar to that of FIG. 24 of the above-described fourth embodiment. Therefore, the explanation thereof is omitted.

In the control device 123 of FIG. 24, the memory unit of the control part 154 stores a second load rotating speed table TB4 and a fourth judge reference table TB5, which is for judging the load of the electric motor 114 on the basis of the current value, in order to execute the fourth automatic switching process. The second load rotating speed table TB4 is a table for setting the rotating speed in accordance with the load detected from the current value.

<Configuration Example of Second Load Rotating Speed Table>

FIG. 25 is an explanatory drawing showing a configuration example of the second load rotating speed table TB4 used in the fourth automatic switching process which is executed by the control part 154 in the fifth embodiment. FIG. 26 is an explanatory drawing showing a configuration example of the fourth judge reference table TB5 used in the fourth automatic switching process which is executed by the control part 154.

The second load rotating speed table TB4 is the information for determining the rotating speed of the electric motor 114 in accordance with the load state of the electric motor 114 in the load mode, and shows the relations of initial current values, current-value increments, and the rotating speeds of the electric motor 114 as shown in FIG. 25.

The initial current value is indicative of the current flowing to the electric motor 114 while the electric motor 114 is driven in the no-load mode, and the current-value increment is the current value increased from the current initial value.

In the second load rotating speed table TB4, the initial current values are divided into, for example, five ranges; wherein the larger the initial current value, the more the rotating speed of the electric motor 114 is increased. The current-value increments are divided into, for example, four ranges; wherein the larger the current-value increment, the higher the rotating speed of the electric motor 114.

Therefore, in the second load rotating speed table TB4, when the initial current value and the current-value increment are the largest, the electric motor 114 is at the maximum rotating speed; and, when the initial current value and the current-value increment are the smallest, the electric motor 114 is at the minimum rotating speed.

When the control part 154 controls the rotating speed of the electric motor 114 in the load mode, the control part 154 references the second load rotating speed table TB4, and sets the rotating speed, which is optimum in accordance with the load state of the electric motor 114, on the basis of the current initial value and the current increment.

As shown in FIG. 26, the fourth judge reference table TB5 has load rotating speeds and current no-load judge reference values. The current no-load judge reference values are reference values of the current value for judging that the electric motor 114 is in the no-load state in accordance with the rotating speed of the electric motor 114. As the current no-load judge reference values, the values obtained by adding the no-load judge current values set in advance to the initial current value are set. The control part 154 references the fourth judge reference table TB5 and judges whether or not the electric motor 114 is in the no-load state.

<Outline of Fourth Automatic Switching Process>

Figure 27:
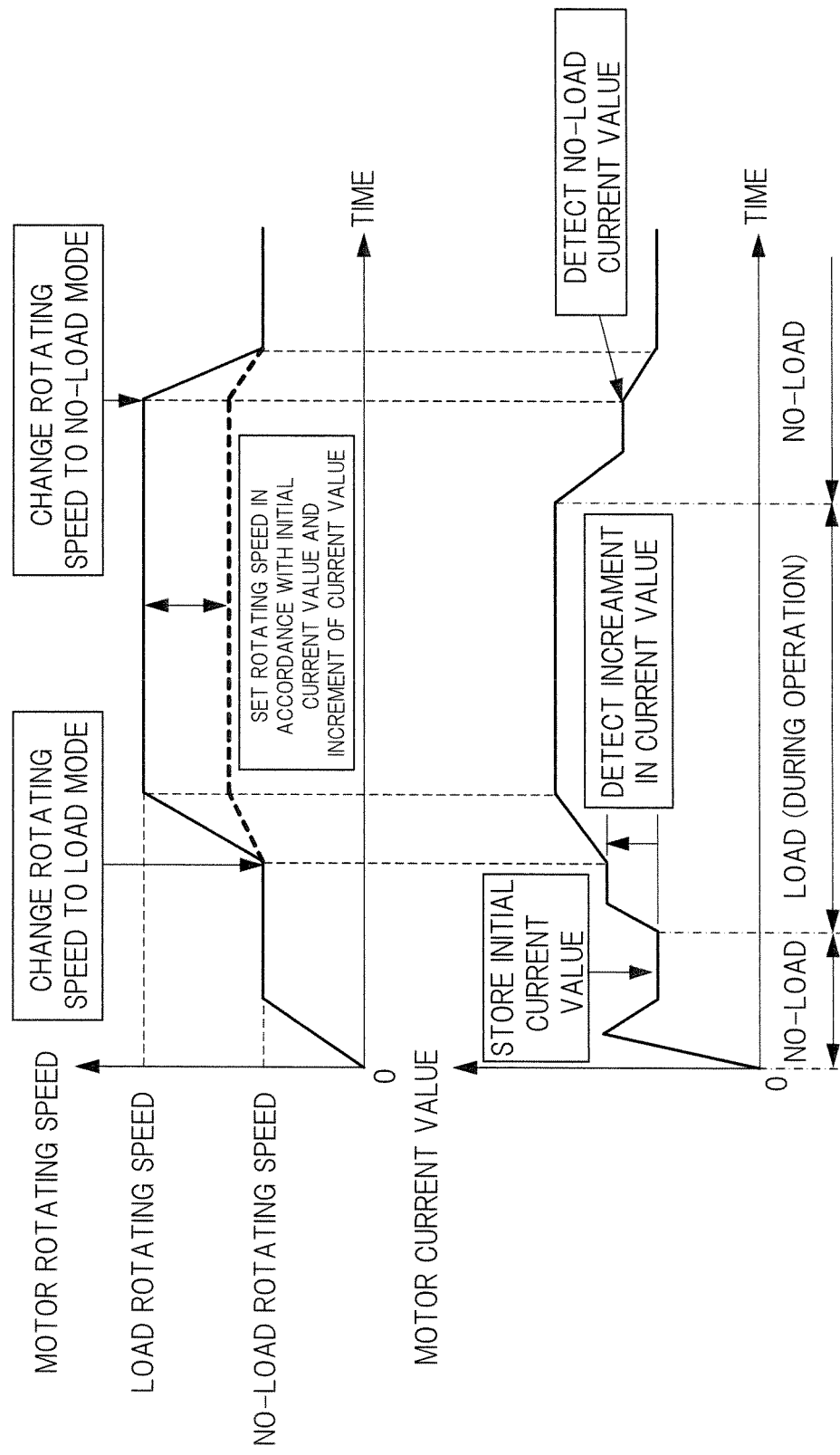
FIG. 27 is a timing chart showing an example of the rotating speed of an electric motor and the current flowing to the electric motor in a fourth automatic switching process.

Subsequently, an outline of the fourth automatic switching process which is executed by the control part 154 will be explained with reference to FIGS. 14 and 27. FIG. 27 is a timing chart showing an example of the rotating speed of the electric motor 114 and the value of the current flowing to the electric motor 114 in the fourth automatic switching process which is executed by the control part 154.

First, when the main switch 121 is turned on when the electric power tool 110 is not operating, the electric motor 114 starts rotating, and the rotating speed of the electric motor 114 is controlled according to the no-load mode. The rotating speed of the electric motor 114 in the no-load mode is a rotating speed which is lower than 4000 rpm, which is the lowest rotating speed in the second load rotating speed table TB4 shown in FIG. 25, for example by about 20%. In this case, 4000 rpm corresponds to the first rotating speed of the present invention, and the rotating speed lower than 4000 rpm by about 20% corresponds to the second rotating speed of the present invention.

Then, when the rotating speed of the electric motor 114 becomes a stable state, the current flowing to the electric motor 114 is detected and stored as the initial current value. Subsequently, when the electric power tool 110 starts an operation and the load of the electric motor 114 is increased, the control part 154 increases the conduction angle of the triac 157 in order to maintain the rotating speed of the electric motor 114. As a result, the current flowing to the electric motor 114 is increased from the initial current value, and the electric motor 114 is driven in the load mode.

In the drive of the load mode, the rotating speed optimally selected in accordance with the value of the initial current flowing to the electric motor 114 and the load state is set on the basis of the second load rotating speed table TB4 shown in FIG. 25.

Then, when the electric power tool 110 finishes the operation and the current flowing to the electric motor 114 is reduced, the control part 154 judges that the electric motor 114 is in the no-load state on the basis of the fourth judge reference table TB5 shown in FIG. 26. Then, the control part 154 reduces the conduction angle of the triac 157, controls the rotating speed of the electric motor 114 according to the no-load mode, and maintains the rotating speed of the electric motor 114.

In this manner, by judging the load of the electric motor 114 according to the current flowing to the electric motor 114 and minutely controlling the rotating speed of the electric motor 114 by the control part 154 on the basis of the judge result of the load, the vibrations, noise, power consumption, etc. of the electric power tool 110 can be reduced.

Furthermore, since the optimum rotating speed is set in accordance with the load state of the electric motor 114, when a soft material is cut with the electric power tool 110, an object can be prevented from being melted with heat. Furthermore, when a hard material such as metal is cut with the electric power tool 110, the rotating speed of the electric motor 114 becomes high; therefore, insufficient power, etc. upon cutting can be prevented, and operation efficiency can be improved.

<Example of Fourth Automatic Switching Process>

Subsequently, the fourth automatic switching process which is executed by the control part 154 will be explained with reference to FIGS. 14 and 28.

Figure 28:
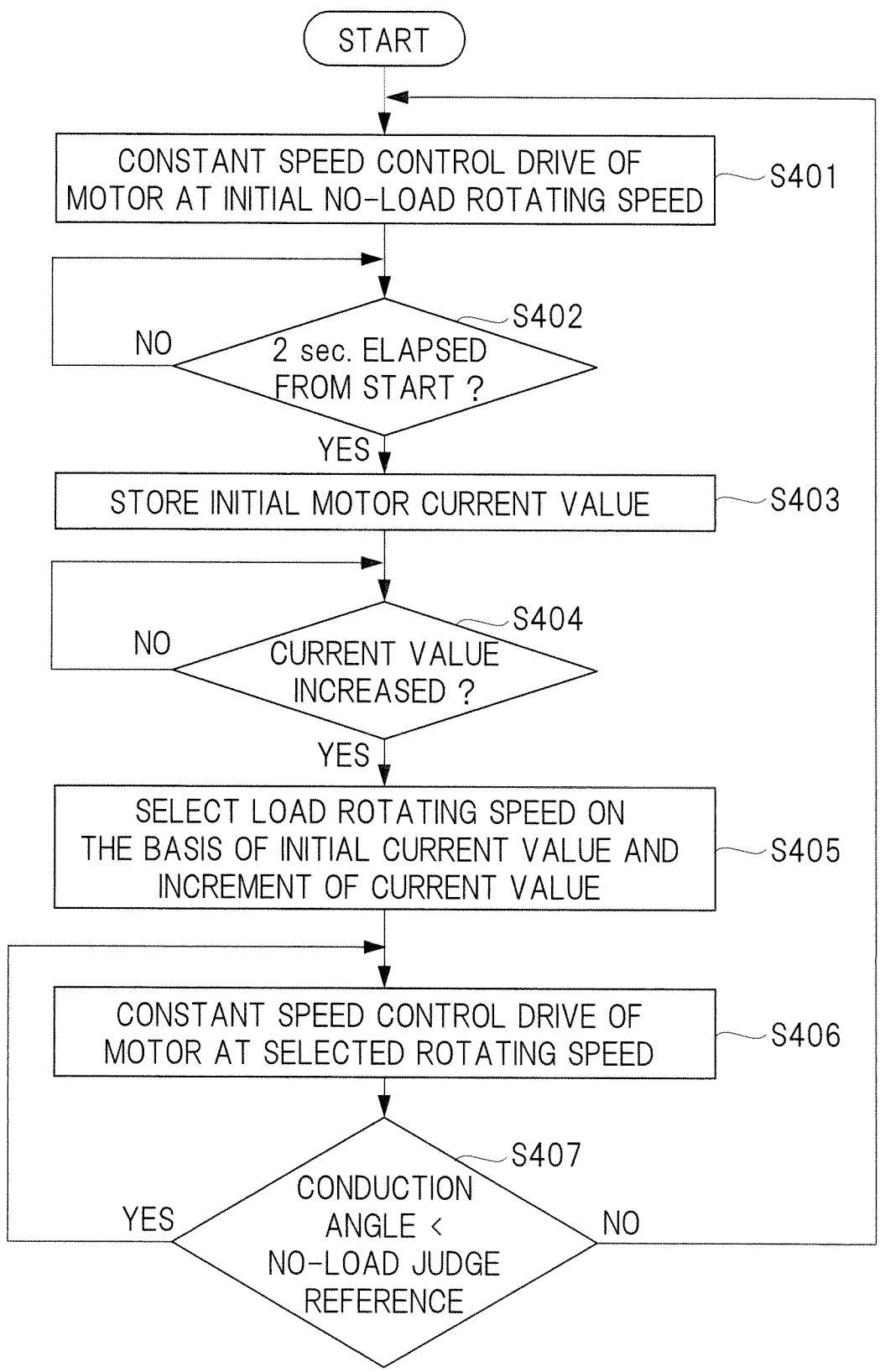
FIG. 28 is a flow chart showing an example of the fourth automatic switching process.

FIG. 28 is a flow chart showing an example of the fourth automatic switching process which is executed by the control part 154.

When the main switch 121 is turned on when the electric power tool 110 is not operating, the control part 154 causes the electric motor 114 to rotate and controls the rotating speed of the electric motor 114 according to the no-load mode (step S401). As described above, the rotating speed of the electric motor 114 in the no-load mode is, for example, the rotating speed which is about 80% of 4000 rpm, which is the lowest rotating speed in the load mode. In this case, 4000 rpm corresponds to the first rotating speed of the present invention, and the rotating speed which is about 80% of the 4000 rpm corresponds to the second rotating speed of the present invention.

The control part 154 judges whether about 2 seconds have elapsed after the electric motor 114 started rotating (step S402). When about 2 seconds have elapsed after the electric motor 114 started rotating and when the rotating speed of the electric motor 114 is stabilized, the current flowing to the electric motor 114 detected by the current detecting circuit 155 is stored in, for example, the memory unit of the control part 154 as the initial current value (step S403).

Then, the control part 154 judges whether the current flowing to the electric motor 114 has been increased from the initial current value or not (step S404). When the current flowing to the electric motor 114 is increased from the initial current value, the control part 154 selects the rotating speed of the electric motor 114 according to the initial current value and the current-value increment after the increase on the basis of the second load rotating speed table TB4 stored in the memory unit (step S405), and the control part controls the rotating speed of the electric motor 114 so as to maintain the rotating speed selected in the process of step S405 (step S406). As a result, the rotating speed corresponding to the state of load is set as the rotating speed of the electric motor 114.

For example, when the initial current value is 1.5 A and the increment of the current value is 1 A, the rotating speed of the electric motor 114 is set at 6000 rpm according to the second load rotating speed table TB4 shown in FIG. 25. Therefore, the control part 154 controls the conduction angle of the triac 157 so that the rotating speed of the electric motor 114 is maintained at 6000 rpm.

Meanwhile, when the inertia caused when the tip tool 133 attached to the electric power tool 110 is moved is increased, the initial current flowing to the electric power tool 110 is increased in order to maintain the rotating speed of the electric motor 114 in the no-load mode. Therefore, it is expected that the larger the inertia of the tip tool 113 attached to the electric power tool 110, the larger the load applied to the electric motor 114.

Therefore, it is expected that, the larger the initial current value, the larger the load applied to the electric motor 114 in the carried out operation; and even in a case in which the increment of the current value in the load mode is the same value, control is carried out so that, the larger the initial conduction angle of the no-load mode, the larger the rotating speed of the electric motor 114 in the load mode.

A case in which the inertia caused when the tip tool 113 was moved was small and the current value was, for example, 0.5 A and a case in which the inertia caused when the tip tool 113 was moved was large and the current value was, for example, 4.5 A will be discussed.

When the current-value increment is, for example, 0.5 A in the case in which the initial current value is 0.5 A, the rotating speed of the electric motor 114 in the load mode is set at 4000 rpm according to the second load rotating speed table TB4 shown in FIG. 25. Therefore, the control part 154 controls the conduction angle of the triac 157 so that the rotating speed of the electric motor 114 is maintained at 4000 rpm.

On the other hand, when the current-value increment is 0.5 A in the case in which the initial current value is 4.5 A, the rotating speed of the electric motor 114 in the load mode is set at 12000 rpm according to the second load rotating speed table TB4 shown in FIG. 25. Therefore, the control part 154 controls the conduction angle of the triac 157 so that the rotating speed of the electric motor 114 is maintained at 12000 rpm.

In this manner, the control of changing the rotating speed of the electric motor 114 in the load mode in accordance with the inertia caused when the attached tip tool 113 is moved is carried out. As a result, the rotating speed becomes optimum in accordance with the load in the operation of the electric power tool 110. Therefore, insufficient power or excessive application of force to an object in the operation of the electric power tool 110 can be prevented.

Subsequently, on the basis of the fourth judge reference table TB5 shown in FIG. 26, the control part 154 judges whether the current flowing to the electric motor 114 is larger than the current no-load judge reference value corresponding to the rotating speed of the electric motor 114 set in the process of step S405 (step S407).

For example, when 4000 rpm is selected as the rotating speed of the electric motor 14 in the above-described manner in the process of step S405, the current no-load judge reference value is "the initial current value+0.5 A" according to the fourth judge reference table TB5 shown in FIG. 26.

Therefore, in the process of step S407, whether the current flowing to the electric motor 114 is larger than "the initial current value+0.5" or not is judged.

When the current flowing to the electric motor 114 is larger than the current no-load judge reference value in the process of step S407, a state that load is applied to the electric motor 114 is determined, and the process returns to the process of step S406.

When the current flowing to the electric motor 114 is smaller than the current no-load judge reference value in the process of step S407, a state that load is not applied to the electric motor 114 is determined, and the process returns to the process of step S401.

In this manner, the rotating speed of the electric motor 114 is adjusted in accordance with the increase/reduction of the current value with respect to the initial current flowing to the electric motor 114. Therefore, the rotating speed of the electric motor 114 in the load mode can be set with high precision regardless of variations, etc. in the characteristics of the electric motor 114.

As described above, the load of the electric motor 114 can be judged in accordance with the current flowing to the electric motor 114, and the rotating speed of the electric motor 114 can be controlled to the optimum rotating speed on the basis of the judge result. Therefore, the vibrations, noise, power consumption, etc. of the electric power tool 110 can be reduced.

Furthermore, since the optimum rotating speed is set in accordance with the load state of the electric motor 114, operation efficiency can be improved. Furthermore, in the electric power tool 110, which can carry out various operations such as cutting, peel-off, and polishing by vibrating the tip tool 113 in the left-right direction, the optimum rotating speed can be controlled in accordance with the inertia caused when the tip tool 113 is moved.

Hereinabove, the invention accomplished by the present inventor has been explained in detail on the basis of the embodiments. However, the present invention is not limited to the above-described embodiments, and it goes without saying that various modifications can be made in a range not deviating from the gist thereof.

The present invention is not limited to the above-described embodiments, but includes various modification examples. For example, the above-described embodiments have been explained in detail in order to understandably explain the present invention, and the invention is not necessarily limited to those having all the explained components.

Part of the components of a certain one of the embodiments can be replaced with the component(s) of another one of the embodiments, and the component (s) of a certain one of the embodiments can be added to another one of the embodiments. Furthermore, part of the components of the embodiments can be subjected to addition of other components, removal, and replacement.

Figure 29:
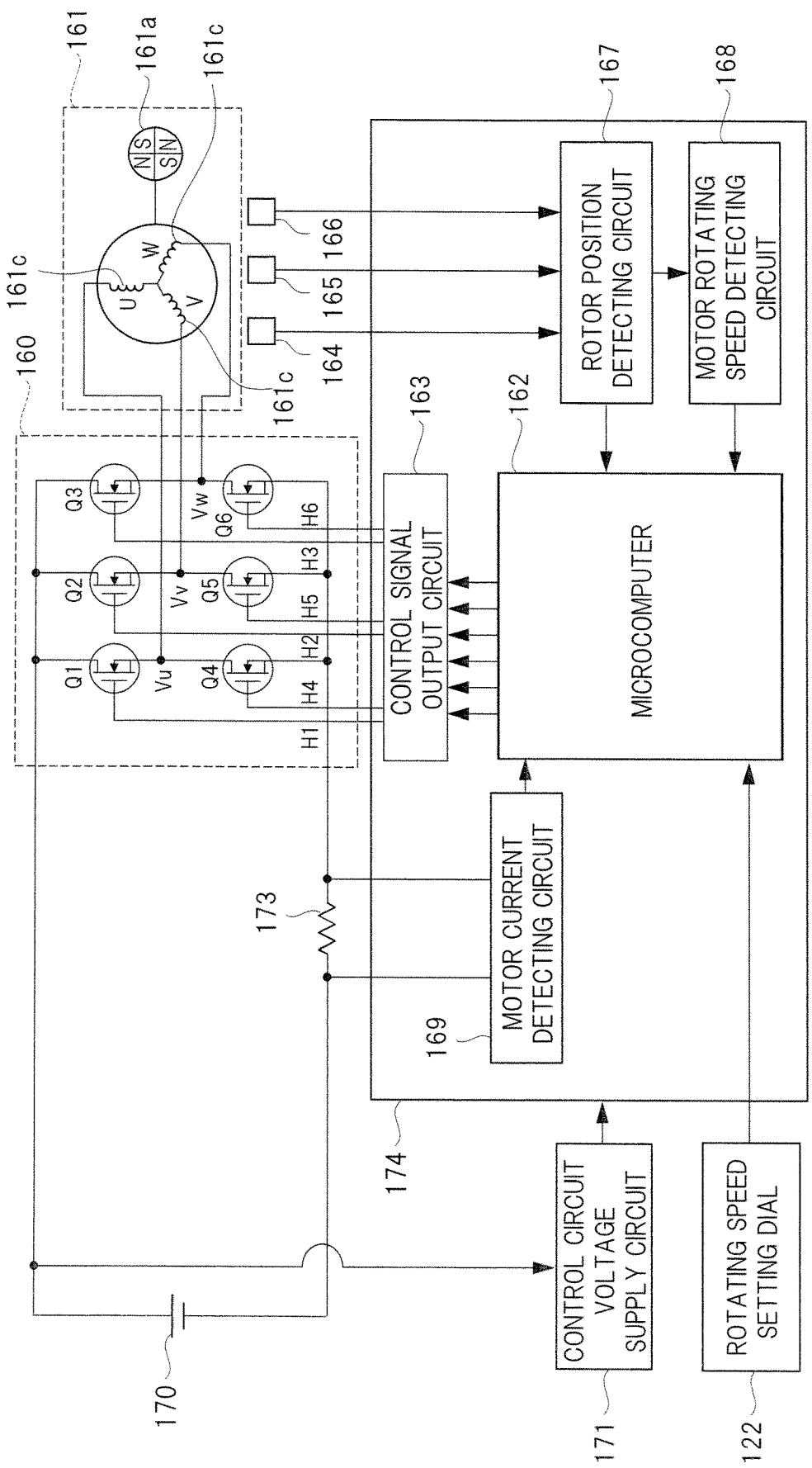
FIG. 29 is an explanatory drawing showing a configuration example of an inverter circuit configured to control a brushless motor in another embodiment of the present invention.

The above-described second and third embodiments are configured to control the rotating speed of the electric motor 114 by controlling the conduction angle of the triac 157 by controlling on and off of the triac 157. On the other hand, as shown in FIG. 29, an electric power tool may be configured to have a brushless motor 161 serving as the electric motor, an inverter circuit 160 which controls the brushless motor 161, and a rotating speed control circuit 174. In this case, the inverter circuit 160 subjects switching elements Q1 to Q6, which are composed of six FETs, etc. as known, to switching control, thereby driving the brushless motor 161. The brushless motor 161 has a stator, three coils 161c wound around the stator, and rotor 161a disposed in the inner peripheral side of the stator. The three coils 161c correspond to a U-phase, a W-phase, and a V-phase.

Control signals output from a microcomputer 162 are converted into control signals H1 to H6 via a control signal output circuit 163, and the control signals H1 to H6 are input to the switching elements Q1 to Q6. In this manner, each of the switching elements Q1 to Q6 of the inverter circuit 160 is controlled to be turned on and off by the microcomputer 162. The positional information of the rotor 161a of the brushless motor 161 is detected by position detecting units 164 to 166 composed of three Hall elements, and signals output from the position detecting units 164 to 166 are input to the microcomputer 162 via a rotor position detecting circuit 167.

The signals output from the position detecting units 164 to 166 are also input to a motor-rotating speed detecting circuit 168, and the motor-rotating speed detecting circuit 168 detects the rotating speed of the brushless motor 161. A motor-current detecting circuit 169 detects a voltage drop generated at a shunt resistance 173, thereby detecting the current flowing to the brushless motor 161. As a drive source of the brushless motor 161, a battery pack 70 is detachably provided in the electric power tool 110. The above-described microcomputer 162, the control signal output circuit 163, the rotor-position detecting circuit 67, the motor-rotating speed detecting circuit 168, the motor-current detecting circuit 169, etc. constitute the rotating speed control circuit 174.

When a current flows from the battery pack 170, a drive power source required in the rotating speed control circuit 174 is generated by a control-circuit voltage supply circuit 171. Furthermore, a rotating speed setting dial 122 operated by an operator is provided. The rotating speed setting dial 122 is operated for setting the rotating speed of the brushless motor 161 by the operator. When a signal indicating the rotating speed set by an operation of the rotating speed setting dial 122 is input to the microcomputer 162, the microcomputer 162 outputs the control signals for turning on and off the switching elements Q1 to Q6 in accordance with the set rotating speed. The rotating speed control circuit 174 shown in FIG. 29 may cause the duty ratio of the switching elements Q1 to Q6 in a case of the no-load mode to the brushless motor 161 to be stored in a storage element in the microcomputer 162 as an initial duty ratio and may control the rotating speed of the brushless motor 161 to be an optimum rotating speed in accordance with a duty increment from the stored initial duty ratio. The optimum rotating speed of the brushless motor 161 is stored in the microcomputer 162 in advance as well as the second and third embodiments.

The duty ratio is a ratio of the on-time and the off-time of the switching element in a certain period, and the conduction angle explained in the above-described second and third embodiments are also the on-time of the triac 157 in a certain period. Thus, the duty period and the conduction angle have equivalent meaning. Instead of controlling the rotating speed of the brushless motor 161 on the basis of the duty ratio, the rotating speed of the brushless motor 161 may be controlled in accordance with the current flowing to the coil 161c of the brushless motor 161. In this case, control may be carried out in a manner similar to the control of the above-described second and third embodiments. The above-described conduction angle, the duty ratio, or the current value corresponds to a control value of the present invention. Thus, the initial conduction angle, the initial duty ratio, and the initial current value are included in the initial control value of the present invention.

A state in which an operation of, for example, grinding, polishing, or cutting an object is being carried out with the tip tool is the load state of the electric motor or the load state of the tip tool. On the other hand, a state in which the operation is not being carried out with the tip tool is the no-load state of the electric motor or the no-load state of the tip tool. "Type is different" in the present invention includes the meaning such as the load is different, the weight or inertia is different, and the operation is different. In FIG. 29, a detachable battery pack is used as a drive source in the electric power tool 110, but it may be an alternating-current power source.

What is claimed is:

1. An electric power tool comprising:
   an electric motor;
   a control part configured to control a rotating speed of the electric motor; and
   a rotating speed detecting circuit connected to the control part, and configured to detect a rotating speed of the electric motor, wherein
   the control part has an automatic mode in which the control part controls the rotating speed of the electric motor on the basis of a load judge value and a no-load judge value,
   when the control part is in the automatic mode, and the electric motor is at least in a no-load state, the control part carries out a feedback control so that the rotating speed of the electric motor approaches a no-load rotating speed, by controlling a control value that is changing a voltage supplying to the motor,
   the control part is configured to set the load judge value to be smaller than the no-load judge value,
   the control part controls the electric motor so that the electric motor is rotated at a no-load rotating speed when the control value of the electric motor is smaller than the no-load judge value, and the control part controls the electric motor so that the electric motor is rotated at a load rotating speed that is larger than the no-load rotating speed when the control value of the electric motor is larger than the load judge value.

2. The electric power tool according to claim 1, further comprising a speed changing part operable by a user,
   wherein the control part is configured to change the load rotating speed by operation of the speed changing part.

3. The electric power tool according to claim 2,
   wherein the control part is configured to change the no-load rotating speed by operation of the speed changing part.

4. The electric power tool according to claim 2, further comprising a display part configured to display at least one of the load rotating speed and the no-load rotating speed.

5. The electric power tool according to claim 2, further comprising an operating piece which is operated to supply the current to the electric motor, wherein the speed changing part and the operating piece are operable separately.

6. The electric power tool according to claim 1, wherein the control part is configured to control the electric motor at the load rotating speed for a predetermined period of time when starting to rotate the electric motor.

7. The electric power tool according to claim 1, wherein the electric motor is configured to drive a tip tool, the control part is configured to change the load rotating speed on the basis of the type of tip tool.

8. The electric power tool according to claim 1, wherein the control part is configured to turn on and off a switching element to control a voltage applied to the electric motor,
   the control value corresponds to an on-time of the switching element.

9. The electric power tool according to claim 1, wherein the control part has a stationary mode in which the control part controls the rotating speed of the electric motor so as to hold the rotating speed constant, without being affected by a load applied to the electric motor.

10. The electric power tool according to claim 9, further comprising a mode switch which is operated by an operator so as to switch the control part between the stationary mode and the automatic mode.

11. The electric power tool according to claim 1,
    wherein the control part is configured to perform a conduction angle control,
    wherein the control value is a conduction angle.

12. The electric power tool according to claim 1, further comprising an inverter circuit having a plurality of switching elements,
    wherein the motor is a brushless motor which is controlled by the inverter circuit,
    wherein the control value is a duty ratio of the switching elements.

13. An electric power tool comprising:
    an electric motor;
    a control part configured to control a rotating speed of the electric motor by controlling a control value that is changing a voltage supplying to the motor; and
    a rotating speed detecting circuit connected to the control part, and configured to detect a rotating speed of the electric motor, wherein
    the control part has an automatic mode in which the control part changes the rotating speed of the electric motor on the basis of a load judge value and a no-load judge value,
    wherein the control unit is configured to perform in the automatic mode that:
    drives the electric motor so that the rotating speed of the electric motor approaches a no-load rotating speed in a no-load state by controlling the control value,
    drives the electric motor so that the rotating speed of the electric motor approaches a load rotating speed that is larger than the no-load rotating speed in a load state by controlling the control value,
    increasing the control value and drives the electric motor at the load rotating speed when the control value changed by the control unit in accordance with increasing in a load on the electric motor exceeds the load judge value in the no-load state,
    reducing the control value and drives the electric motor at the no-load rotating speed, when the control value changed by the control unit in accordance with decreasing in the load on the electric motor becomes smaller than the no-load judge value in the no-load state, and
    wherein the no-load judge value is larger than the load judge value.

* * * * *